(12) United States Patent
Kasai

(10) Patent No.: US 8,727,553 B2
(45) Date of Patent: May 20, 2014

(54) LIGHTING DEVICE, DISPLAY DEVICE AND TELEVISION RECEIVER

(75) Inventor: Nobuhiro Kasai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 272 days.

(21) Appl. No.: 13/390,961

(22) PCT Filed: Jun. 24, 2010

(86) PCT No.: PCT/JP2010/060710
§ 371 (c)(1),
(2), (4) Date: Feb. 17, 2002

(87) PCT Pub. No.: WO2011/027609
PCT Pub. Date: Mar. 10, 2011

(65) Prior Publication Data
US 2012/0147275 A1     Jun. 14, 2012

(30) Foreign Application Priority Data
Sep. 7, 2009 (JP) ................................. 2009-206009

(51) Int. Cl.
*G09F 13/04*     (2006.01)
*G09F 13/08*     (2006.01)

(52) U.S. Cl.
USPC .......................... 362/97.2; 362/97.1; 362/97.3

(58) Field of Classification Search
USPC ................. 362/97.1, 97.2, 97.3, 227, 249.14, 362/249.06, 646, 647; 348/739; 349/61; 40/605
See application file for complete search history.

(56) References Cited

U.S. PATENT DOCUMENTS

| 2006/0198968 A1 | 9/2006 | Goto et al. |
| 2007/0115228 A1 | 5/2007 | Roberts et al. |
| 2007/0115248 A1 | 5/2007 | Roberts et al. |
| 2007/0115662 A1 | 5/2007 | Roberts et al. |
| 2007/0115670 A1 | 5/2007 | Roberts et al. |
| 2007/0115671 A1 | 5/2007 | Roberts et al. |
| 2007/0115682 A1 | 5/2007 | Roberts et al. |

(Continued)

FOREIGN PATENT DOCUMENTS

| JP | 2006-133708 A | 5/2006 |
| JP | 2008-028171 A | 2/2008 |

(Continued)

OTHER PUBLICATIONS

Official Communication issued in International Patent Application No. PCT/JP2010/060710, mailed on Sep. 21, 2010.

*Primary Examiner* — Mariceli Santiago
*Assistant Examiner* — Glenn Zimmerman
(74) *Attorney, Agent, or Firm* — Keating & Bennett, LLP

(57) ABSTRACT

In a lighting device 12 according to the present invention, a first board 20a and a second board 20b on which a plurality of light sources 17 are mounted are arranged in a first board arrangement area 30a and a second board arrangement area 30b of a chassis 14, respectively, in respective predetermined orientations. The first board 20a includes a first board-side interlock portion 31a interlocked with a first chassis-side interlock portion 32a provided in the first board arrangement area 30a, and the second board 20b includes a second board-side interlock portion 31b interlocked with a second chassis-side interlock portion 32b provided in the second board arrangement area 30b. In arranging the first board 20a in the second board arrangement area 30b, the first board-side interlock portion 31a is not interlocked with the second chassis-side interlock portion 32b.

33 Claims, 25 Drawing Sheets

(56) References Cited

U.S. PATENT DOCUMENTS

| | | |
|---|---|---|
| 2007/0216704 A1 | 9/2007 | Roberts et al. |
| 2008/0117356 A1 | 5/2008 | Oku et al. |
| 2008/0143916 A1* | 6/2008 | Fujino et al. ............ 349/58 |
| 2008/0285268 A1 | 11/2008 | Oku et al. |
| 2009/0180273 A1 | 7/2009 | Kim et al. |
| 2009/0219714 A1 | 9/2009 | Negley et al. |
| 2009/0264683 A1 | 10/2009 | Goto et al. |
| 2009/0310335 A1* | 12/2009 | Park .................... 362/97.1 |
| 2010/0008066 A1* | 1/2010 | Moro et al. ............ 362/97.1 |
| 2010/0039806 A1 | 2/2010 | Roberts et al. |
| 2010/0135028 A1 | 6/2010 | Kokubo |
| 2011/0006325 A1 | 1/2011 | Ishii et al. |
| 2011/0127917 A1 | 6/2011 | Roberts et al. |
| 2011/0228530 A1 | 9/2011 | Roberts et al. |

FOREIGN PATENT DOCUMENTS

| | | |
|---|---|---|
| JP | 2008-130841 A | 6/2008 |
| JP | 2008-152101 A | 7/2008 |
| JP | 2008-198398 A | 8/2008 |
| JP | 2009-043628 A | 2/2009 |
| JP | 2009-510764 A | 3/2009 |
| JP | 2009-516357 A | 4/2009 |
| JP | 2009-130360 A | 6/2009 |
| WO | 2008/127064 A1 | 10/2008 |
| WO | 2009/072539 A1 | 6/2009 |

* cited by examiner

LIGHTING DEVICE, DISPLAY DEVICE AND TELEVISION RECEIVER

TECHNICAL FIELD

The present invention relates to a lighting device, a display device and a television receiver.

BACKGROUND ART

For example, a liquid crystal panel used for a liquid crystal display device such as a liquid crystal television set does not emit light by itself, and therefore, requires a separate backlight unit as a lighting device. The known backlight unit is installed on the back side of a liquid crystal panel (side opposite to a display surface) and includes a lot of light sources (for example, LEDs).

Such backlight unit is adapted to obtain white light by combining LEDs of plural colors such as a blue LED, a red LED and a green LED. However, since the LED of each color has larger variation in both chromaticity and brightness than other light sources such as a cold cathode tube, when the LED are arranged in a random manner, uneven color and uneven brightness can occur. Thus, Patent Document 1 describes a device adapted to suppress uneven color and uneven brightness while using the LEDs as light sources. A plurality of units each emitting white light from, for example, one red LED, one blue LED and two green LEDs are arranged on a wiring board to configure light source devices. In each light source device, a first green LED and a second green LED that are different from each other in chromaticity or brightness are arranged in a zigzag manner, and adjacent light source devices are inverted from each other by 180 degrees. As a result, since the first green LED and the second green LED are adjacent to each other in the aligning direction of the light source devices, the adjacent light source devices can average green chromaticity or brightness, thereby suppressing uneven color and uneven brightness.

PRIOR ART DOCUMENT

Patent Document

Patent Document 1: Japanese Unexamined Patent Publication No. 2008-130841

PROBLEM TO BE SOLVED BY THE INVENTION

As described above, in the device described in Patent Document 1, to suppress uneven color and uneven brightness, it is important that the light source devices are arranged according to different LED arrangement manners (more specifically, arrangement of the LEDs is inverted by 180 degrees) to be adjacent to each other. However, in mounting the light source devices, the arrangement direction or alignment order of the light source devices may be wrong. In such a case, between the adjacent light source devices, the first green LED or the second green LED may be adjacent to each other. As a result, the uniform green chromaticity or brightness cannot be obtained. Moreover, difference between regions in chromaticity or brightness is further highlighted, contributing remarkable uneven color or uneven brightness.

DISCLOSURE OF THE PRESENT INVENTION

In consideration of the situation above, an object of the present invention is to provide a lighting device adapted to prevent wrong arrangement of the board that mounts the light sources thereon with simple configuration. Another object of the present invention is to provide a display device including such lighting device and a television receiver including such display device.

Means for Solving the Problem

To attain the above objects, a lighting device according to the present invention includes a first board and a second board and a chassis. A plurality of light sources are mounted on the first board and the second board. The first board and the second board are arranged on the chassis. The chassis has a first board arrangement area in which the first board are arranged and a second board arrangement area in which the second board are arranged. The first board and the second board are arranged in the first board arrangement area and the second board arrangement area, respectively, in respective predetermined orientations. The first board includes a first board-side interlock portion interlocked with a first chassis-side interlock portion with the first board arranged in the first board arrangement area. The first chassis-side interlock portion is provided in the first board arrangement area. The second board includes a second board-side interlock portion interlocked with a second chassis-side interlock portion with the second board arranged in the second board arrangement area. The second chassis-side interlock portion is provided in the second board arrangement area. The first board-side interlock portion is configured so as not to be interlocked with the second chassis-side interlock portion with the first board arranged in the second board arrangement area in the predetermined orientation.

According to this configuration, by interlocking the first board-side interlock portion of the first board with the first chassis-side interlock portion of the chassis, the first board can be properly arranged in the chassis. Further, by interlocking the second board-side assembling portion of the second board with the second chassis-side interlock portion of the chassis, the second board can be properly arranged in the chassis. Even if it is attempted to arrange the first board at a position in the chassis where the second board should be arranged (second board arrangement area), the first board-side interlock portion is prevented from being assembled to the second chassis-side interlock portion and therefore, the first board cannot be arranged in the chassis. In this manner, since only the first board can be arranged at the position in the chassis where the first board should be arranged (first board arrangement area) and only the second board can be arranged at the position in the chassis where the second board should be arranged (second board arrangement area), confused arrangement of the first board and the second board can be reliably prevented.

BEST MODE FOR CARRYING OUT THE INVENTION

<First embodiment>

A first embodiment of the present invention will be described with reference to FIGS. 1 to 9.

First, the configuration of a television receiver TV including a liquid crystal display device 10 will be described.

Figure 1:
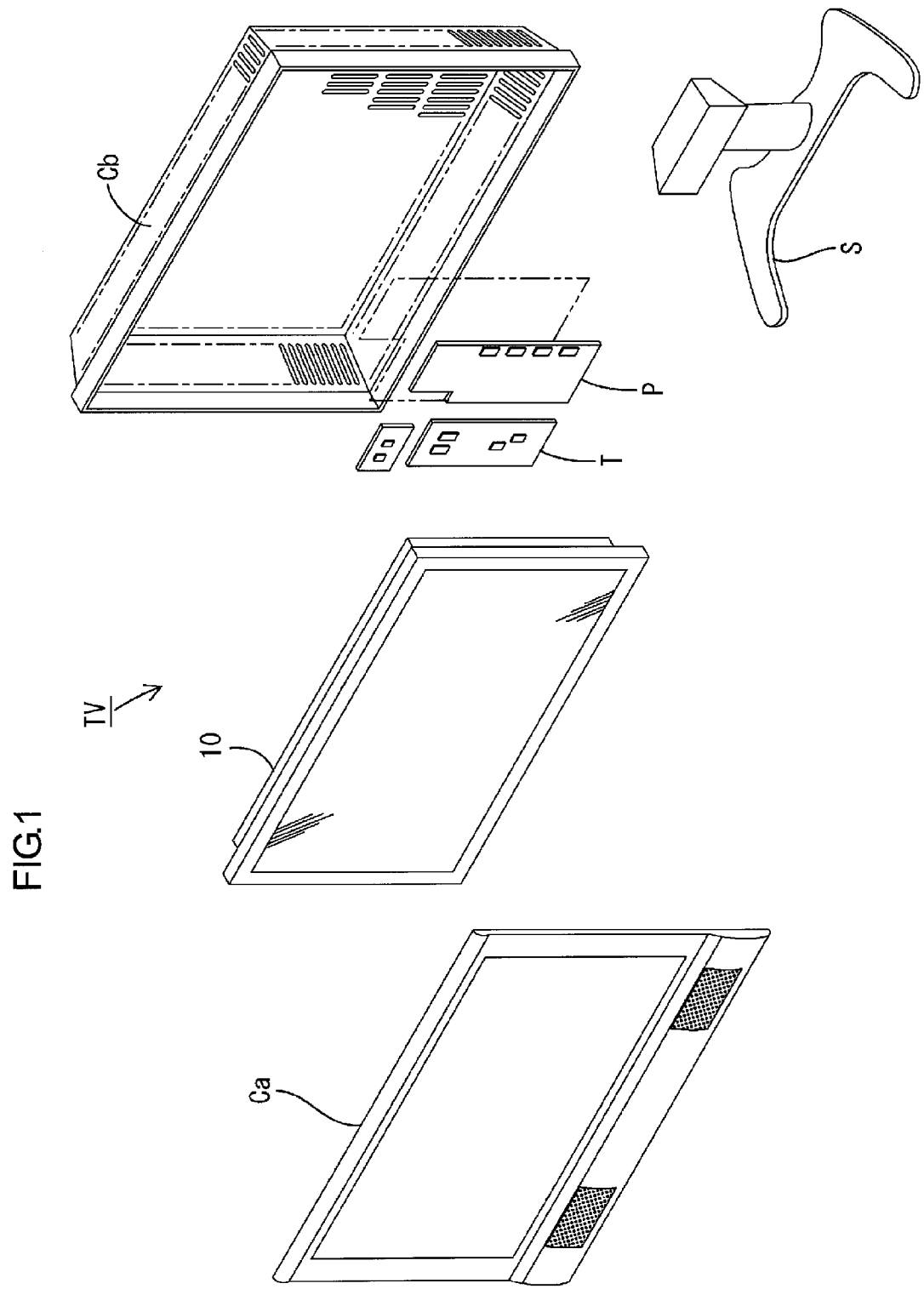
FIG. 1 is an exploded perspective view showing a schematic configuration of a television receiver according to a first embodiment of the present invention.

A television receiver TV according to this embodiment includes, as shown in FIG. 1, the liquid crystal display device 10, front and back cabinets Ca and Cb that store the liquid crystal display device 10 therebetween, a power source P, a tuner T and a stand S. The liquid crystal display device (display device) 10 is shaped like an oblong quadrangle as a whole and is stored in a vertically mounted state. The liquid crystal display device 10 includes, as shown in FIG. 2, a liquid crystal panel 11 as a display panel and a backlight unit (lighting device) 12 as an external light source, and these components are integrally held by a frame-like bezel 13 or the like.

Figure 3:
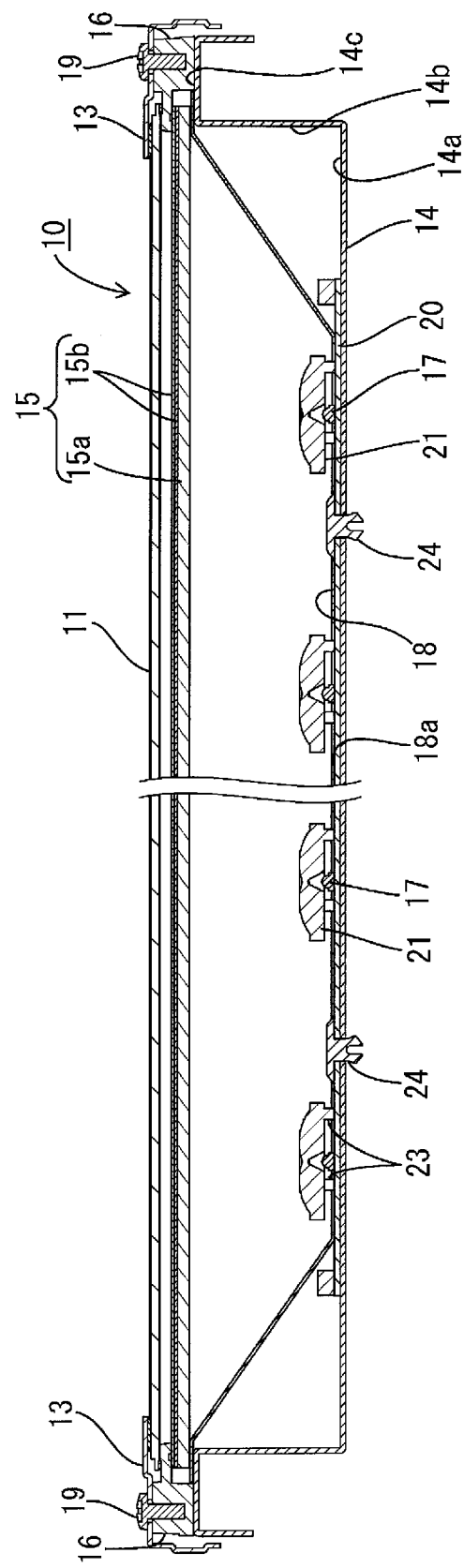
FIG. 3 is a sectional view showing a configuration of a cross section of the liquid crystal display device along the long-side direction.
Figure 4:
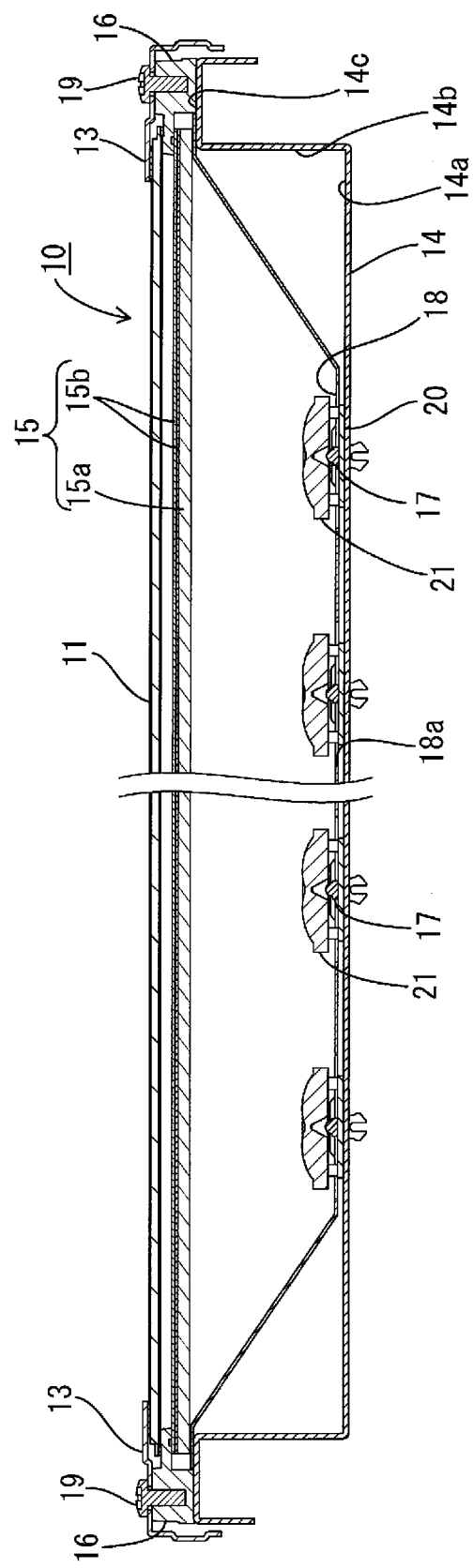
FIG. 4 is a sectional view showing a configuration of the cross section of the liquid crystal display device along the short-side direction.

Next, the liquid crystal panel 11 and the backlight unit 12 that constitute the liquid crystal display device 10 will be described (refer to FIG. 2 to FIG. 4).

The liquid crystal panel (display panel) 11 is formed by sticking a pair of glass boards to each other with a predetermined gap and filling liquid crystal between both the glass boards. One glass substrate has a switching component (for example, TFT) connected to a source wiring and a gate wiring that are orthogonal to each other, a pixel electrode connected to the switching component and an alignment film, and the other glass substrate has a color filter in which color sections of R (red), G (green), B (blue) are arranged in a predetermined pattern, a counter electrode and an alignment film and the like. Polarizing plates are provided on the outer side of the both substrates.

Figure 2:
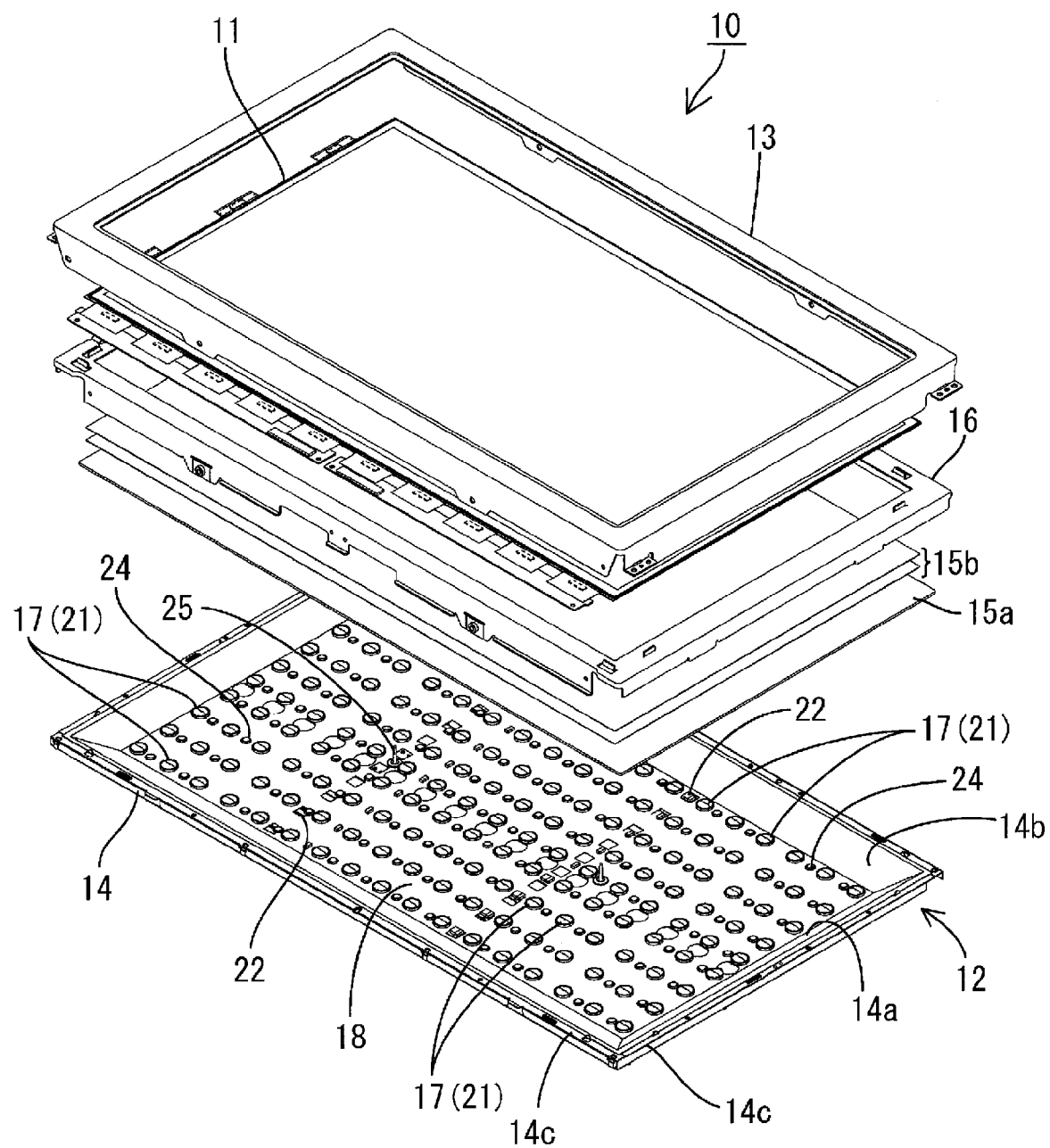
FIG. 2 is an exploded perspective view showing a schematic configuration of a liquid crystal display device provided in the television receiver.

As shown in FIG. 2, the backlight unit 12 includes a substantially box-shaped chassis 14 opened toward a light emitting surface (liquid crystal panel 11 side), an optical sheet group 15 (a diffuser plate 15a and a plurality of optical sheets 15b arranged between the diffuser plate 15a and the liquid crystal panel 11) covering an opening of the chassis 14, and a frame 16 that is arranged along an outer edge of the chassis 14 and sandwiches an outer edge of the diffuser plate 15a between the frame 16 and the chassis 14 to hold the outer edge of the diffuser plate 15a. Light emitting diodes (light sources, hereinafter referred to as LED) 17 are arranged in the chassis 14. In the backlight unit 12, the side of the optical member 15a, not the LEDs 17, is set as a light emitting side.

The chassis 14 is made of metal and includes a rectangular bottom plate 14a as in the case of the liquid crystal panel 11, a side plate 14b rising from an outer end of each side of the bottom plate 14a and a receiving plate 14c protruding outward from a rising end of each side plate 14b to substantially form a shallow box opened toward the front side as a whole. As shown in FIGS. 3 and 4, the frame 16 is placed on the receiving plates 14c of the chassis 14 and a below-mentioned reflective sheet 18 and the outer edge of the optical sheet group 15 are sandwiched between the receiving plates 14c and the frame 16. The frame 16 includes an attachment hole 16a in an upper surface thereof, and a bezel 13, the frame 16 and the chassis 14 can be integrated by means of a screw 19 or the like.

The optical sheet group 15 formed of the diffuser plate 15a and the optical sheets 15b is arranged on the opening side of the chassis 14. The diffuser plate 15a is formed by dispersing light scattering particles in a plate member made of synthetic resin and has a function to diffuse point-like light emitted from LEDs 17 as point light sources. As described above, the outer edge of the diffuser plate 15a is placed on the receiving plates 14c of the chassis 14 and is not subject to a strong restraining force in the vertical direction.

The optical sheets 15b arranged on the diffuser plate 15a are each shaped like a sheet that is thinner than the diffuser plate 15a, and two optical sheets 15b are stacked. Specific examples of the optical sheets 15b include diffuser sheets, lens sheets, reflection type polarizing sheets, and it is possible to select and use any of these sheets as appropriate. The optical sheets 15b have a function to convert light, which is emitted from the LEDs 17 and passes through the diffuser plate 15a, into planar light. The liquid crystal panel 11 is installed on the upper surface side of the optical sheets 15b.

The reflective sheet 18 is arranged so as to cover almost the entire inner surfaces of the bottom plate 14a and the side plates 14b of the chassis 14. The reflective sheet 18 is made of synthetic resin and has a surface of white color having an excellent optical reflectance. The reflective sheet 18 has a hole 18a at a position corresponding to a below-mentioned diffuser lens 21. Accordingly, although the reflective sheet 18 covers the entire the bottom plate 14a of the chassis 14, the diffuser lens 21 is exposed toward the optical sheet group 15 through the hole 18a. The reflective sheet 18 rises in an inclined manner from an edge of the bottom plate 14a to the inner surfaces of the side plates 14b, and an outer edge of the reflective sheet 18 is placed on the receiving plates 14c of the chassis 14. The reflective sheet 18 can reflect light emitted from the LEDs 17 toward the diffuser plate 15a.

Figure 5:
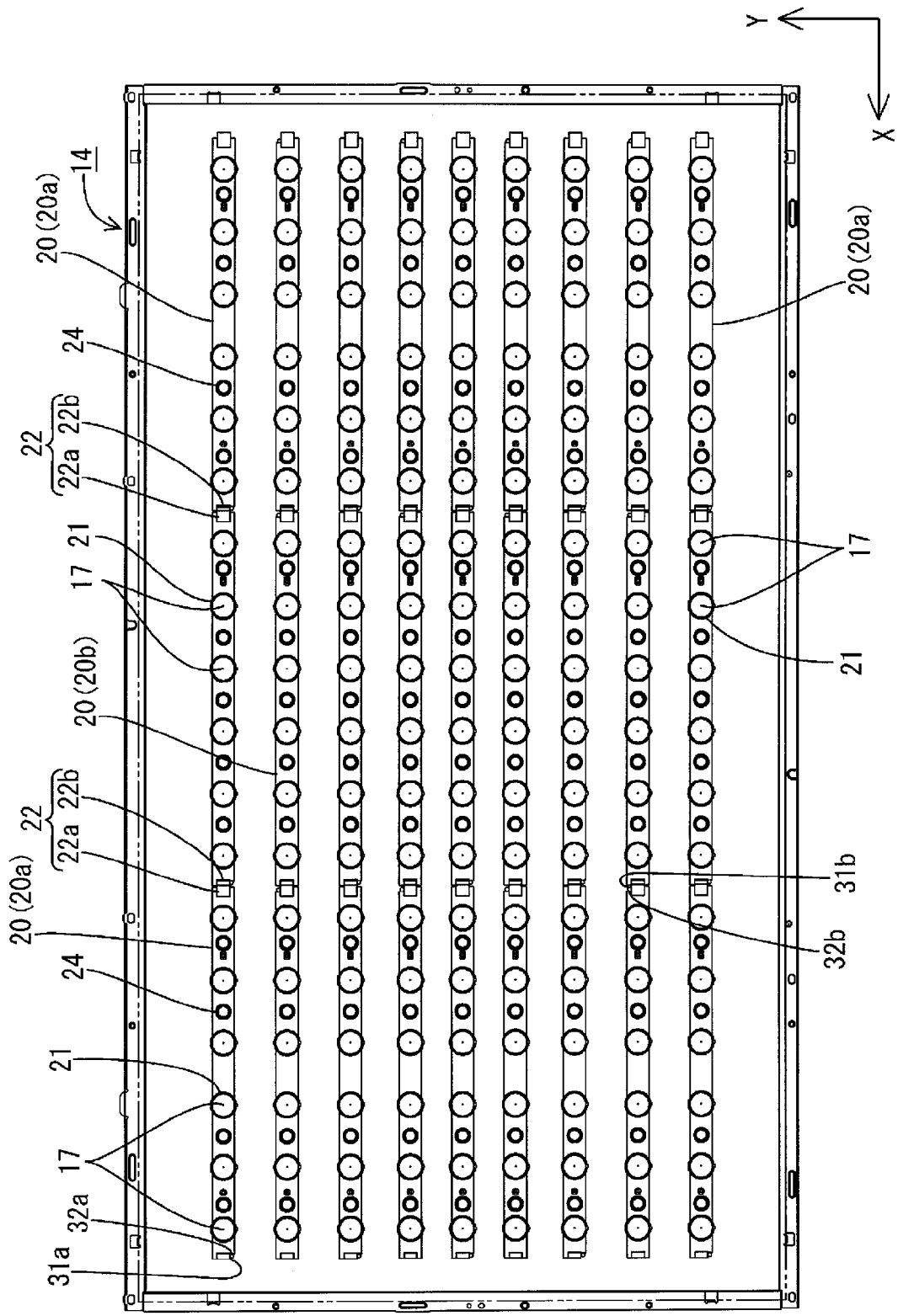
FIG. 5 is a plan view showing an arrangement manner of LED boards in a chassis.

The chassis 14 includes on its inner surface of the bottom plate 14a an LED board 20 (a first LED board 20a and a second LED board 20b), to which the LEDs 17 and the diffuser lens 21 are attached. The LED board 20 is rectangular and is made of synthetic resin. A wiring pattern formed of a metal foil such as a copper foil is formed on the surface of the LED board 20. As shown in FIG. 5, the LED board 20 is an elongated plate-like member having the longitudinal direction that matches the long-side direction of the chassis 14 (X-axis direction). Describing in more detail, the three LED boards 20, 20, 20 are arranged along the long-side direction of the chassis 14 as the board's longitudinal direction, and are electrically and physically connected to one another by means of connectors 22. Further, when viewing in the short-side direction of the chassis 14 (Y-axis direction), the three serially connected LED boards 20, 20, 20 are arranged in parallel in nine columns. To these LED board 20 an external control unit not shown is connected. The control unit can supply electric power necessary for lighting the LEDs 17 and control driving of the LEDs 17.

The connectors 22 connecting the adjacent LED boards 20 to each other are white color having an excellent optical reflectance. Each connector 22 is configured of a first connector 22a attached to the LED board 20 located relatively on the left side in FIG. 5 and a second connector 22b located relatively on the right side in FIG. 5. Here, the first connector 22a extends outward from the longitudinal end of the LED board 20, and the first connector 22a and the second connector 22b are engaged with each other, thereby connecting the LED boards 20, 20 to each other.

The six LEDs 17 are linearly arranged on each LED board 20 (in a line) along the longitudinal direction of the LED board 20. Describing in more detail, the six LEDs 17 are mounted on each LED board 20 at regular intervals. These LEDs 17 emit white light by applying a phosphor having a luminous peak in a yellow region to a blue light emitting chip emitting only blue light. The LEDs 17 are electrically connected in serial by means of the wiring pattern formed on the LED board 20. The LEDs 17 may emit white light by applying a phosphor having the luminous peak in green and red regions to the blue light emitting chip. Alternatively, the LEDs 17 may emit white light by applying a phosphor having the luminous peak in the green region to the blue light emitting chip and combining a red chip. Alternatively, the LEDs 17 may emit white light by combining the blue, green and red light emitting chips.

Figure 6:
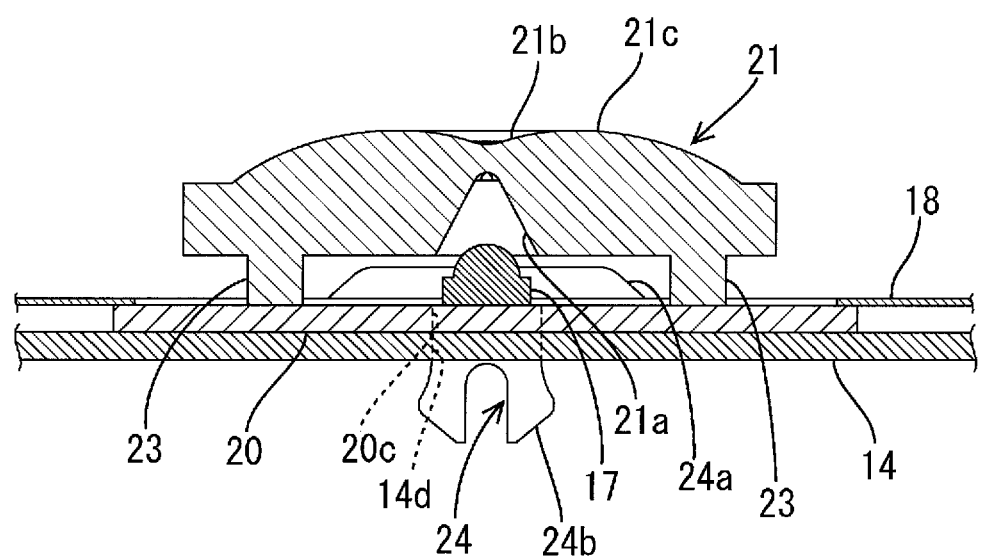
FIG. 6 is a main part enlarged sectional view showing a configuration of members attached to the LED boards.
Figure 7:
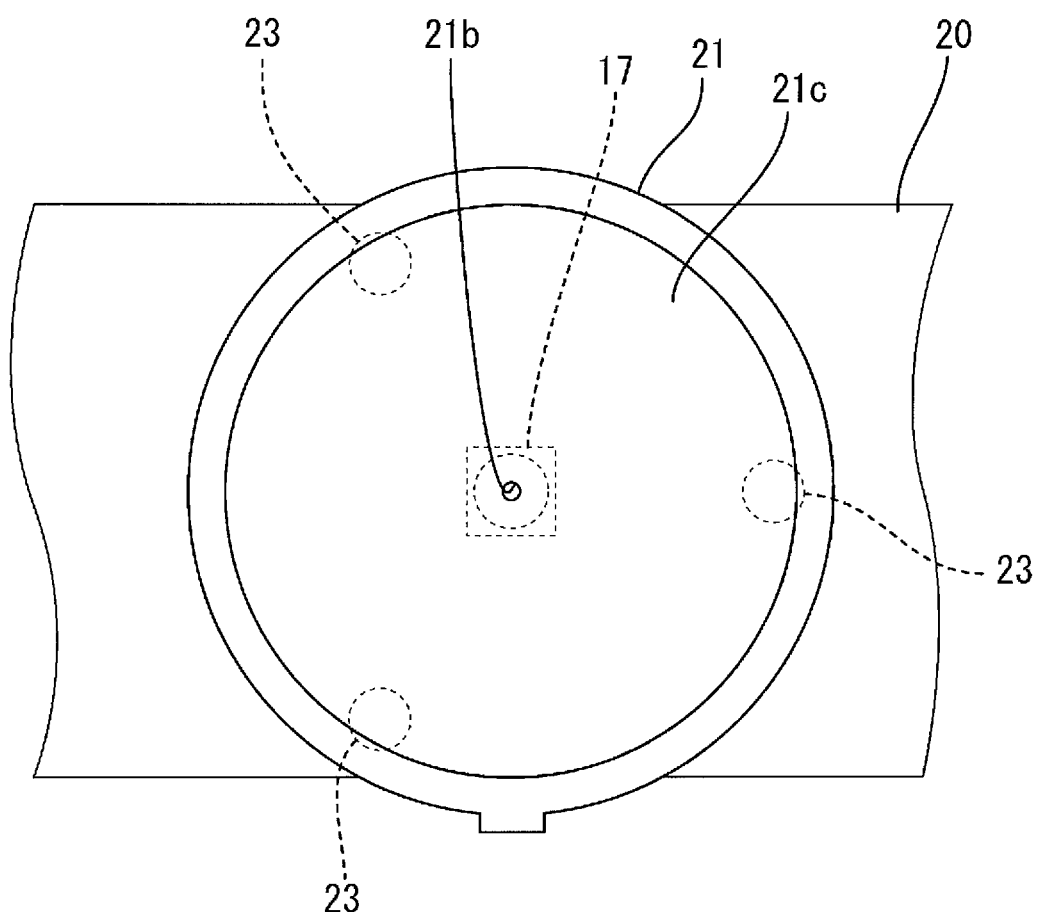
FIG. 7 is a main part enlarged sectional view showing a configuration of the members attached to the LED board.

Next, each member attached to the LED board 20, such as the diffuser lens 21, will be described with reference to FIGS. 6 and 7. FIG. 6 is a main part enlarged sectional view showing a configuration of the members attached to the LED board, and FIG. 7 is a main part enlarged plan view showing a configuration of the members attached to the LED board.

As shown in FIG. 6, the substantially hemispherical diffuser lens 21 covering each LED 17 is attached to the LED board 20. The diffuser lens 21 is a light diffusing member having an excellent light diffusing property and is made of synthetic resin such as acrylic. Three legs 23 protrude from edge areas of a lower surface of the diffuser lens 21. As shown in FIG. 7, the three legs 23 are arranged along the circumference of the diffuser lens 21 at substantially regular intervals (about 120 degrees), and are fixed to the surface of the LED board 20 with an adhesive, thermosetting resin or the like. A substantially conical incident concave part 21a recessed upward is formed at a region overlapping with the LED 17 in a plan view on the lower surface of the diffuser lens 21 (the surface opposite to the LED 17 and the LED board 20), and light from the LED 17 is incident on the incident concave part 21a. The lower surface of the diffuser lens 21 is subjected to surface roughening treatment such as grained treatment. A concave part 21b recessed downward is formed at the center (region overlapping with the LED 17 in a plan view) of an upper surface of the diffuser lens 21 (surface facing the diffuser plate 15a), and an outgoing surface 21c in the shape of two connected moderate circular arc is also formed on the upper surface of the diffuser lens 21. Light emitted from the LED 17 is refracted between an air layer and the incident concave part 21a, and between the outgoing surface 21c and the air layer, thereby being diffused in a planar manner and then, being radiated from the outgoing surface 21c toward the diffuser plate 15a over a wide scope.

Each LED board 20 is fixed to the bottom plate 14a of the chassis 14 with rivets 24. The rivets 24 each have a disc-like pressing part 24a and a locking part 24b protruding downward from the pressing part 24a. An insertion hole 20c through which the locking part 24b is inserted is formed in the LED board 20, and an attachment hole 14d communicated with the insertion hole 20c is formed in the bottom plate 14a of the chassis 14. A front end of the locking part 24b of the rivet 24 is an elastically deformable wide portion, and can be inserted into the insertion hole 20c and the attachment hole 14d and then, locked at the back side of the bottom plate 14a of the chassis 14. Thereby, the rivets 24 can fix the LED board 20 to the bottom plate 14a while pressing the LED board 20 with the pressing part 24a.

As shown in FIG. 2, a supporting pin 25 is protrudingly provided on a surface of the rivet 24 located in the vicinity of the center of the bottom plate 14a of the chassis 14 among the rivets 24. The supporting pin 25 is shaped like a tapered cone. When the diffuser plate 15a is bent downward, the diffuser plate 15a is in a point-contact with the front end of the supporting pin 25, thereby supporting the diffuser plate 15a from below. In addition, by gripping the supporting pin 25, the rivet 24 can easily be handled.

As shown in FIG. 5, the LED boards 20 are arranged in parallel along the short-side direction of the chassis 14 (Y-axis direction). In this embodiment, each LED board 20 is classified into the first LED board 20a and the second LED board 20b on the basis of the light source arrangement manner and color tone arrangement manner, and each LED board is arranged at a predetermined position of the chassis.

Figure 8:
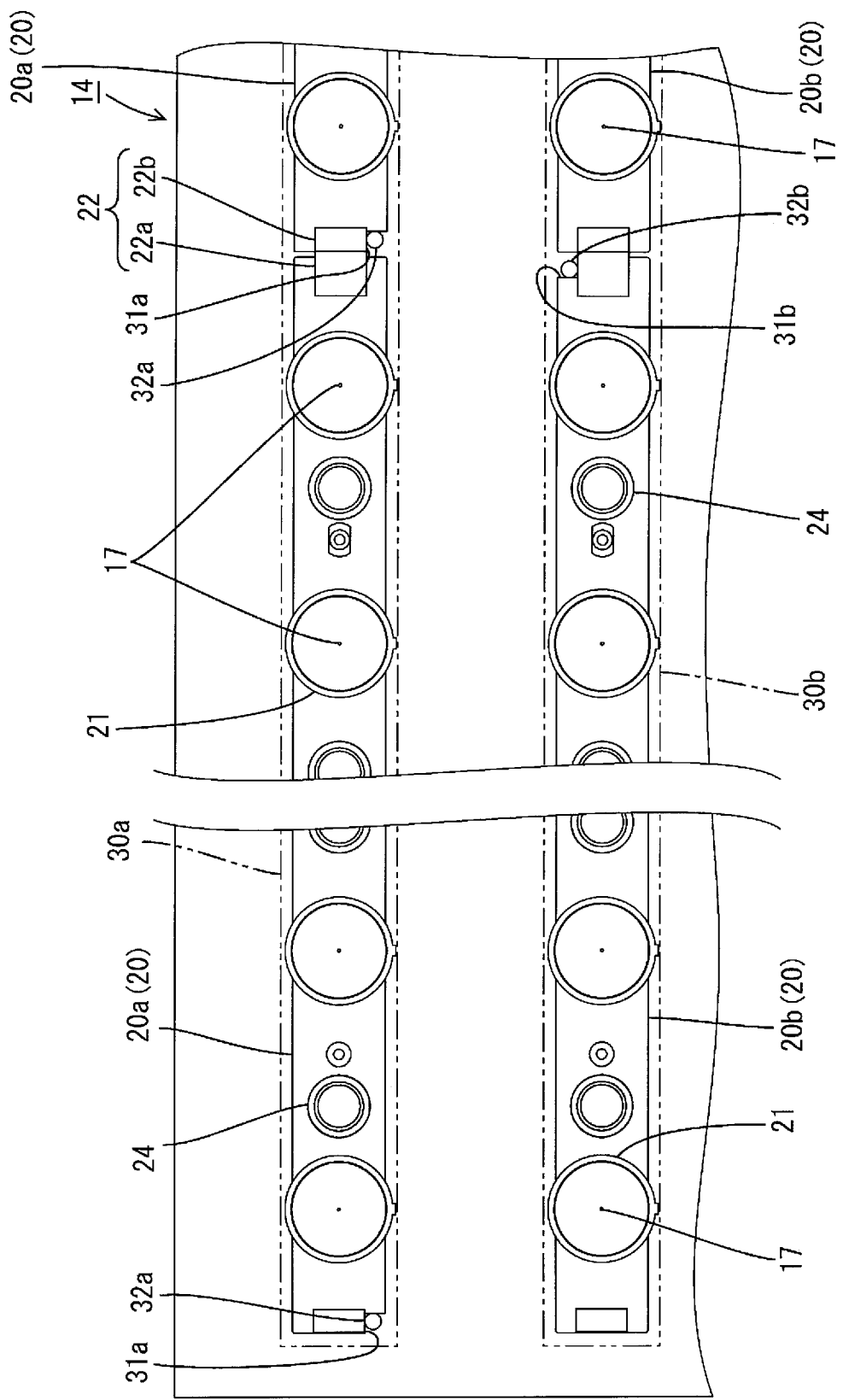
FIG. 8 is an enlarged plan view showing an arrangement manner of the LED boards with respect to the chassis.
Figure 9:
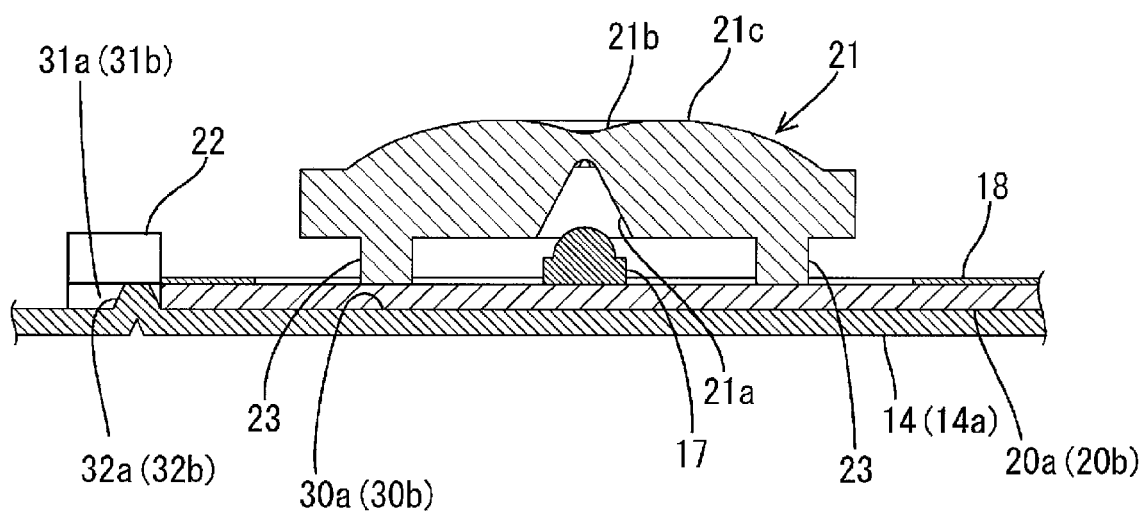
FIG. 9 is a sectional view showing the arrangement manner of the LED boards with respect to the chassis.

The arrangement manners of the first LED board 20a and the second LED board 20b with respect to the chassis 14 will be described below with reference to FIGS. 8 and 9. FIG. 8 is an enlarged plan view showing the arrangement manner of the LED boards with respect to the chassis, and FIG. 9 is a sectional view showing the arrangement manner of the LED boards with respect to the chassis.

In this embodiment, as shown in FIG. 8, in the chassis 14, the first row located uppermost is a first LED board arrangement area 30a and the first LED board 20a of the LED board 20 is arranged in the first LED board arrangement area 30a. The second row located below the first LED board arrangement area 30a is a second LED board arrangement area 30b, and the second LED board 20b of the LED board 20 is arranged in the second LED board arrangement area 30b. Further, the third row is the first LED board arrangement area 30a, and the first LED board 20a is arranged therein, and the fourth row is the second LED board arrangement area 30b and the second LED board 20b is arranged therein. The same arrangement is repeated thereafter.

A first LED board-side notch (first board-side interlock portion) 31a notched in the shape of a rectangle is formed at a longitudinal end, in particular, at a bottom-left corner in the first LED board 20a in FIG. 8. A second LED board-side notch (second board-side interlock portion) 31b notched in the shape of a rectangle is formed at a top-right corner of the second LED board 20b in FIG. 8. In other words, the first LED board-side notch 31a and the second LED board-side notch 31b are provided so as to be diagonally located when the first LED board 20a and the second LED board 20b are placed while keeping their orientations. Therefore, when the first LED board 20a and the second LED board 20b are placed while keeping their orientations, the first LED board-side notch 31a and the second LED board-side notch 31b are formed so as not to overlap with each other.

A first chassis-side protruding portion (first chassis-side interlock portion) 32a and a second chassis-side protruding portion (second chassis-side interlock portion) 32b are formed in the first LED board arrangement area 30a and the second LED board arrangement area 30b of the chassis 14, respectively, in which the first LED board 20a and the second LED board 20b are arranged. Describing in more detail, the first chassis-side protruding portion 32a is formed so as to overlap with the first LED board-side notch 31a and the second chassis-side protruding portion 32b is formed so as to overlap with the second LED board-side notch 31b. As shown in FIG. 9, the first chassis-side protruding portion 32a and the second chassis-side protruding portion 32b are protruded toward the first LED board 20a and the second LED board 20b, respectively, according to sheet metal processing of the chassis 14. In this embodiment, the chassis-side protruding portions 32a and 32b are protruded toward the first LED board 20a and the second LED board 20b, respectively, according to sheet metal processing of the chassis. However, separate members made of metal or resin may be attached to the bottom plate 14a of the chassis 14.

With the configuration above, when it is attempted to arrange the first LED board 20a at a normal position in the chassis 14 (that is, the first LED board arrangement area 30a), the first chassis-side protruding portion 32a engages with the first LED board-side notch 31a (refer to FIG. 9) and the first LED board 20a can be arranged in the first LED board arrangement area 30a. When it is attempted to arrange the second LED board 20b at a normal position of the chassis 14 (that is, the second LED board arrangement area 30b), the second chassis-side protruding portion 32b engages with the second LED board-side notch 31b and the second LED board 20a can be arranged in the second LED board arrangement area 30b.

When it is attempted to arrange the first LED board 20a in the second LED board arrangement area 30b, the first LED board-side notch 31a and the second chassis-side protruding portion 32b are shifted from each other in position. Accordingly, since the second chassis-side protruding portion 32b cannot be engaged with the first LED board-side notch 31a and interferes with a corner of the first LED board-side notch 31a in the first LED board 20a, the first LED board 20a cannot be arranged in the second LED board arrangement area 30b.

As described above, in the backlight unit 12 according to this embodiment, the first LED board 20a includes the first LED board-side notch 31a assembled to the first chassis-side protruding portion 32a provided in the first LED board arrangement area 30a in arranging the first LED board 20a in the first LED board arrangement area 30a in the predetermined orientation, and the second LED board 20b includes the second LED board-side notch 31b assembled to the second chassis-side protruding portion 32b provided in the second LED board arrangement area 30b in arranging the second LED board 20b in the second LED board arrangement area 30b in the predetermined orientation. Then, even if it is attempted to arrange the first LED board 20a in the second LED board arrangement area 30b in the predetermined orientation, the first LED board-side notch 31a cannot be assembled to the second chassis-side protruding portion 32b.

According to this configuration, by interlocking the first LED board-side notch 31a of the first LED board 20a with the first chassis-side protruding portion 32a of the chassis 14, the first LED board 20a can be properly arranged in the chassis 14. Further, by interlocking the second LED board-side notch 31b of the second LED board 20b with the second chassis-side protruding portion 32b of the chassis 14, the second LED board 20b can be properly arranged in the chassis 14. Here, if it is attempted to arrange the first LED board 20a in the second LED board arrangement area 30b, since the first LED board-side notch 31a is prevented from being assembled to the second chassis-side protruding portion 32b, the first LED board 20a cannot be arranged in the chassis 14. As described above, since only the first LED board 20a can be arranged at the position in the chassis 14 where the first LED board 20a should be arranged (the first LED board arrangement area 30a) and only the second LED board 20b can be arranged at the position in the chassis 14 where the second LED board 20b should be arranged (the second LED board arrangement area 30b), confused arrangement of the first LED board 20a and the second LED board 20b can be reliably prevented.

In this embodiment, the first LED board-side notch 31a and the second LED board-side notch 31b are provided so as not to overlap with each other when the first LED board 20a and the second LED board 20b are placed while keeping their orientations. According to this configuration, since the first LED board-side notch 31a is prevented from being assembled to the second chassis-side protruding portion 32b more reliably, wrong board arrangement can be reliably prevented.

The first LED board 20a and the second LED board 20b are elongated, and the first LED board-side notch 31a and the second LED board-side notch 31b are provided at the longitudinal end of the first LED board 20a and the longitudinal end of the second LED board 20b, respectively. According to this configuration, since the first LED board 20a and the second LED board 20b can be arranged in the chassis 14 while gripping the center of the first LED board 20a or the second LED board 20b and viewing the first LED board-side notch 31a or the second LED board-side notch 31b, the reliability of the arrangement operation and the working efficiency can be improved.

The first LED board 20a and the second LED board 20b are each rectangular in a plan view, and the first LED board-side notch 31a and the second LED board-side notch 31b are provided at the corner of the first LED board 20a and the corner of the second LED board 20b, respectively. According to this configuration, the first LED board-side notch 31a and the second LED board-side notch 31b can be provided without exerting any effect the arrangement of the LEDs 17 and wiring on the first LED board 20a and the second LED board 20b. Moreover, since the corners are easy to see in arranging the first LED board 20a and the second LED board 20b in the chassis 14, the interlock between the first LED board-side notch 31a and the first chassis-side protruding portion 32a, or between the second LED board-side notch 31b and the second chassis-side protruding portion 32b becomes easy and therefore, the reliability of the arrangement operation and the working efficiency can be further improved.

The first LED board-side notch 31a and the second LED board-side notch 31b are provided to be diagonally located when the first LED board 20a and the second LED board 20b are placed while keeping their orientations. According to this configuration, since first LED board-side notch 31a and the second LED board-side notch 31b are separated from each other as much as possible, both can easily be distinguished, thereby preventing confusion with the first LED board 20a and the second LED board 20b.

Further, since this embodiment has the simple configuration in which the first LED board-side notch 31a and the second LED board-side notch 31b are assembled to the first chassis-side protruding portion 32a and the second chassis-side protruding portion 32b, respectively, an effort required to form each interlock part can be reduced.

Furthermore, in this embodiment, the plurality of LEDs 17 is linearly arranged along the longitudinal direction of the first LED board 20a and the second LED board 20b. In this case, since the installment manner of the LEDs 17 is uniquely determined according to the arrangement manner of the first LED board 20a and the second LED board 20b, the arrangement of the LEDs 17 can easily be designed.

Furthermore, in this embodiment, the plurality of first LED boards 20a and the plurality of second LED boards 20b are arranged along the longitudinal direction, and the adjacent first LED board 20a and the adjacent second LED board 20b are connected with the connector 22. According to this configuration, by preparing plural types of LED boards 20 of different lengths, that is, having the different number of LEDs 17, even when size (length) of the backlight unit 12 varies, the LED boards 20 can be connected to each other with the connector 22 to address the various sizes. Therefore, preparation of the LED board 20 according to each size of the backlight unit 12 is not required, contributing to cost reduction.

The connector 22 is configured of the first connector 22a and the second connector 22b that are engaged with each other. The first connector 22a extends outward from the longitudinal end of the first LED board 20a or the second LED board 20b. According to this configuration, in connecting the adjacent first LED boards 20a and 20a and the adjacent second LED boards 20b and 20b to each other with the first connector 22a and the second connector 22b, since the first connector 22a extends outside of the LED boards 20a and 20b, the engagement with the first connector 22a and the second connector 22b can be smoothly achieved.

Further, since the connector 22 has a white color having a relatively high light reflectance, the connector 22 is hard to absorb light, preventing brightness from lowering at the position where the connector 22 is arranged.

In this embodiment, the chassis 14 is rectangular in a plan view, and the first LED board 20a and the second LED board 20b are arranged so that the longitudinal direction matches the long-side direction of the chassis 14. According to this configuration, as compared to the case where the longitudinal direction of the LED boards 20a and 20b matches the short-side direction of the chassis 14, the number of the LED boards 20a and 20b can be reduced. Therefore, the number of the control units controlling lighting-on/off can be reduced, contributing to cost reduction.

Since the LEDs 17 are adopted as the light sources in this embodiment, longer life of the light sources and lower electricity consumption can be achieved.

The LED 17 that emits white light by applying a phosphor having a luminous peak in a yellow region to a blue light emitting chip is adopted as the light source. In the case of using the LED 17 that emits white light, for example, the color may vary easily due to occurrence of bluish white light. Accordingly, to suppress the occurrence of uneven color, the arrangement manner of the LEDs 17, in other words, the arrangement manner of the first LED board 20a and the second LED board 20b, is critical. Thus, since wrong arrangement of the LED board 20a and 20b can be prevented by adopting the configuration in this embodiment, the designed board arrangement can reliably be ensured, thereby suppressing the occurrence of uneven color.

The plurality of LEDs 17 is electrically connected in serial. Thus, since the current supplied to each LED 17 can be made constant to make the amount of light emitted from the LEDs 17 constant, uniformity in brightness on the illumination surface of the backlight unit 12 can be improved.

In this embodiment, the diffuser lens 21 adapted to diffuse light from each LED 17 is attached to the first LED board 20a and the second LED board 20b so as to cover the LED 17. In this case, since the diffuser lenses 21 diffuse light, even when the interval between the adjacent LEDs 17 is increased, the lamp image is hard to occur. Therefore, by reducing the number of the arranged LEDs 17, costs can be reduced and almost uniform brightness distribution can be obtained. Further, since colors of light from the LEDs 17 can be mixed by providing such diffuser lenses 21, uneven color can be reduced.

Since the diffuser lenses 21 are each a light diffusing member that can diffuse light, excellent light diffusion can be achieved.

Since the surface of the diffuser lens 21 on the first LED board 20a side and the second LED board 20b side is subjected to surface roughening treatment, more excellent light diffusion can be achieved.

Although the first embodiment of the present invention has been described, the present invention is not limited to the embodiment above, and following various modification examples may be adopted. In each of the following modification examples, the same components and constituents as those in the embodiment above are given the same reference numerals and description thereof is omitted.

<First modification example of first embodiment>

Figure 10:
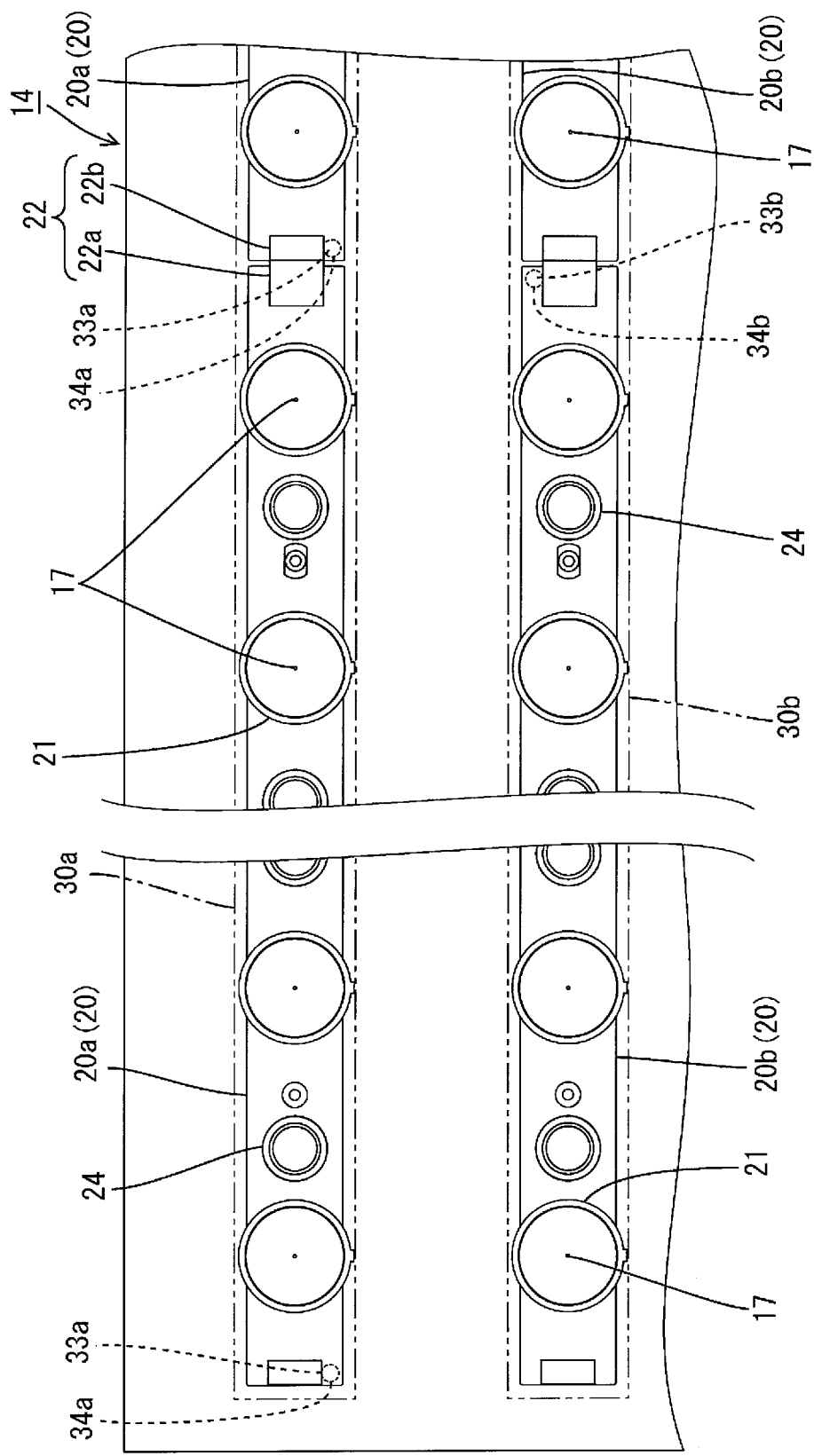
FIG. 10 is a plan view showing one modification example of the arrangement manner of the LED boards with respect to the chassis.
Figure 11:
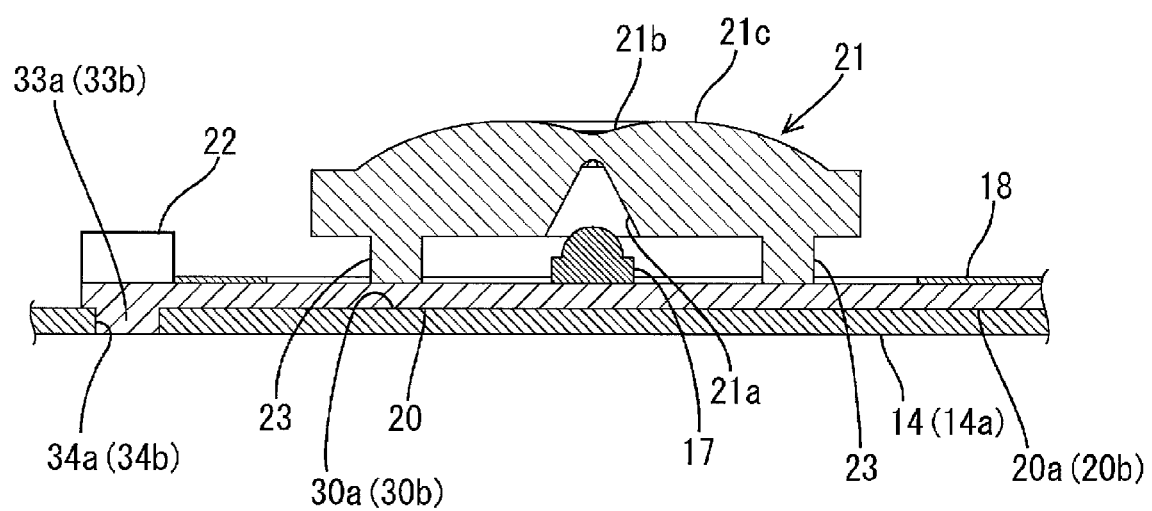
FIG. 11 is a sectional view showing the arrangement manner of the LED boards with respect to the chassis in FIG. 10.

FIGS. 10 and 11 show one modification example of interlock between the first LED board 20a and the second LED board 20b, and the chassis 14. FIG. 10 is a plan view showing one modification example of the arrangement manner of the LED boards with respect to the chassis, and FIG. 11 is a sectional view showing the arrangement manner of the LED boards with respect to the chassis in FIG. 10.

As shown in FIG. 11, a first LED board-side protruding portion 33a protruding toward the chassis 14 is integrally formed at the bottom-left corner of the first LED board 20a (refer to FIG. 10). A second LED board-side protruding portion 33b protruding toward the chassis 14 is integrally formed at the top-right corner of the second LED board 20b (refer to FIG. 10). Each of the first LED board-side protruding portion 33a and the second board-side protruding portion 33b is cylindrical, and its height is almost the same as the thickness of the bottom plate 14a of the chassis 14. The first LED board-side protruding portion 33a and the second LED board-side protruding portion 33b are formed so as not to overlap with each other when the first LED board 20a and the second LED board 20b are placed while keeping their orientations. The first LED board-side protruding portion 33a and the second LED board-side protruding portion 33b are integrally formed in processing the LED boards 20a and 20b in this embodiment. However, for example, separate members may be attached to the LED boards 20a and 20b.

The first LED board arrangement area 30a of the chassis 14 includes a first chassis-side notch 34a so as to overlap with the first LED board-side protruding portion 33a. The second LED board arrangement area 30b of the chassis 14 includes a second chassis-side notch 34b so as to overlap with the second LED board-side protruding portion 33b. The first chassis-side notch 34a and the second chassis-side notch 34b each have a circular cross section and penetrate the bottom plate 14a of the chassis 14. When the first LED board 20a is arranged in the first LED board arrangement area 30a, the first LED board-side protruding portion 33a is fitted into the first chassis-side notch 34a. When the second LED board 20b is arranged in the second LED board arrangement area 30b, the second LED board-side protruding portion 33b is fitted into the second chassis-side notch 34b. Since the first LED board-side protruding portion 33a and the second chassis-side notch 34b, as well as the second LED board-side protruding portion 33 and the first chassis-side notch 34a do not correspond to each other in position, the boards and the chassis cannot be assembled to each other.

Also in the case of forming the protruding portions 33a and 33b in both the boards 20a and 20b, respectively, and forming the notches 34a, 34b in the chassis 14 in this manner, the boards and the chassis can be assembled to each other. In this embodiment, the first LED board-side protruding portion 33a and the second LED board-side protruding portion 33b are formed so as not to overlap with each other when the first LED board 20a and the second LED board 20b are placed while keeping their orientations. Therefore, since the first LED board-side protruding portion 33a cannot be fitted into the second chassis-side notch 34b, it can be prevented that the first LED board 20a is wrongly arranged in the second LED board arrangement area 30b.

<Second modification example of first embodiment>

Figure 12:
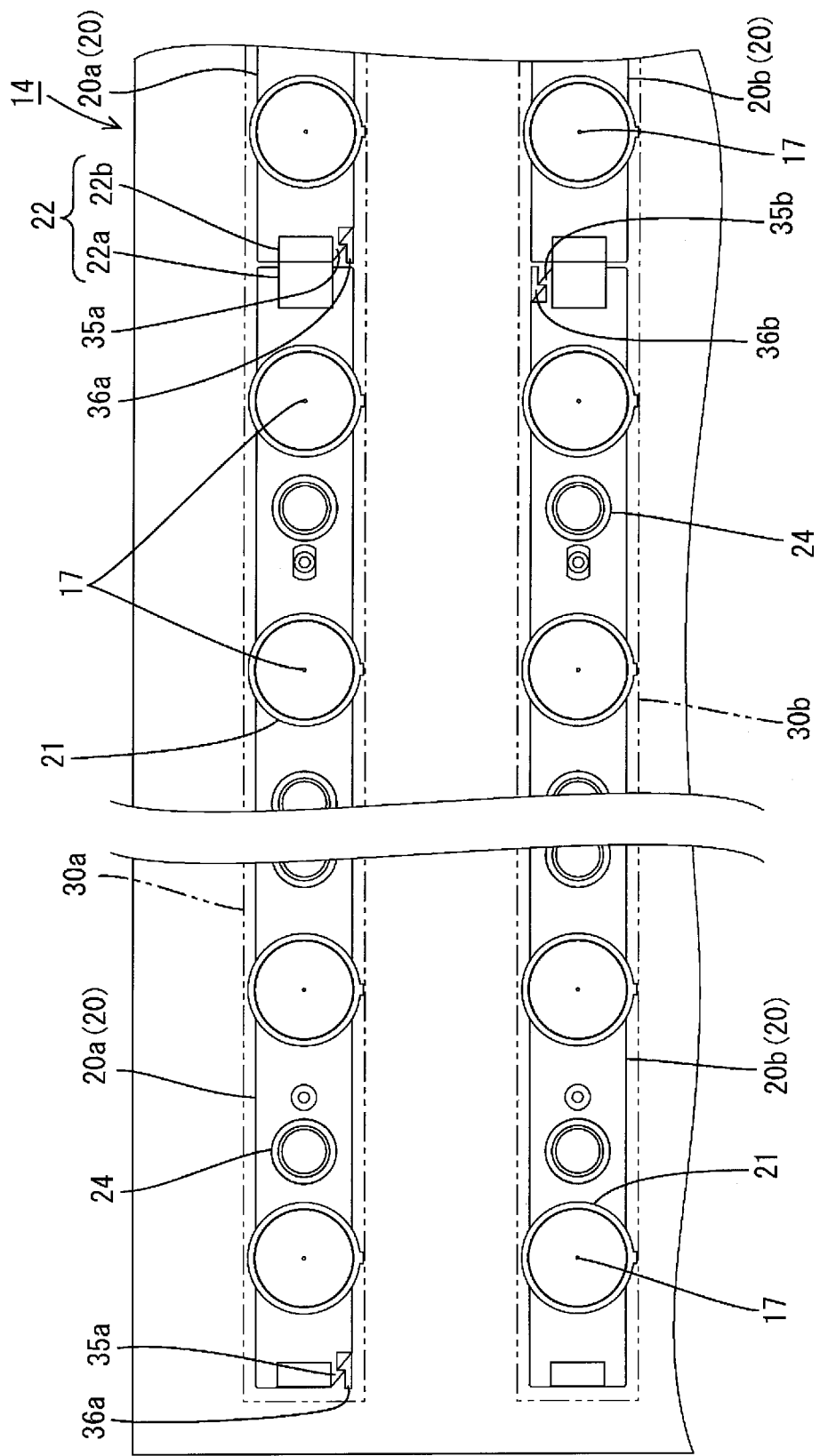
FIG. 12 is an enlarged plan view showing another modification example of the arrangement manner of the LED boards with respect to the chassis.

FIG. 12 shows another modification example of interlock between the first LED board 20a and the second LED board 20b, and the chassis 14. FIG. 12 is a plan view showing another modification example of the arrangement manner of the LED boards with respect to the chassis.

As shown in FIG. 12, a first LED board-side locking portion 35a shaped like a hook along a main surface of the first LED board 20a is formed at a bottom-left corner of the first LED board 20a, and a second LED board-side locking portion 35b shaped like a hook along a main surface of the second LED board 20b is formed at a top-right corner of the second LED board 20b. The first LED board-side locking portion 35a and the second LED board-side locking portion 35b are formed so as not to overlap with each other when the first LED board 20a and the second LED board 20b are placed while keeping their orientations.

The first LED board arrangement area 30a of the chassis 14 includes a first chassis-side locking portion 36a in close vicinity to the first LED board-side locking portion 35a of the first LED board 20a. The first chassis-side locking portion 36a is shaped like a hook facing the first LED board-side locking portion 35a and is locked with the first LED board-side locking portion 35a in arranging the first LED board 20a in the first LED board arrangement area 30a. The second LED board arrangement area 30b of the chassis 14 includes a second chassis-side locking portion 36b in close vicinity to the second LED board-side locking portion 35b of the second LED board 20b. The second chassis-side locking portion 36b is shaped like a hook facing the second LED board-side locking portion 35b, and is locked with the second LED board-side locking portion 35b in arranging the second LED board 20a in the second LED board arrangement area 30b. Since the first LED board-side locking portion 35a and second chassis-side locking portion 36b, as well as the second LED board-side locking portion 35b and the first chassis-side locking portion 36a do not correspond to each other in position, the LED boards and the chassis cannot be assembled to each other.

Also in the case of forming the locking portions 35a and 35b in both the boards 20a and 20b, respectively, and forming the locking portions 36a and 36b in the chassis 14, the LED boards and the chassis can be assembled. In this example, the first LED board-side locking portion 35a and the second board-side locking portion 35b are formed so as not to overlap with each other when the first LED board 20a and the second LED board 20b are placed while keeping their orientation. Accordingly, since the first LED board-side locking portion 35a cannot be locked with the second chassis-side locking portion 36b, it can be prevented that the first LED board 20a is wrongly arranged in the second LED board arrangement area 30b.

<Second embodiment>

Figure 14:
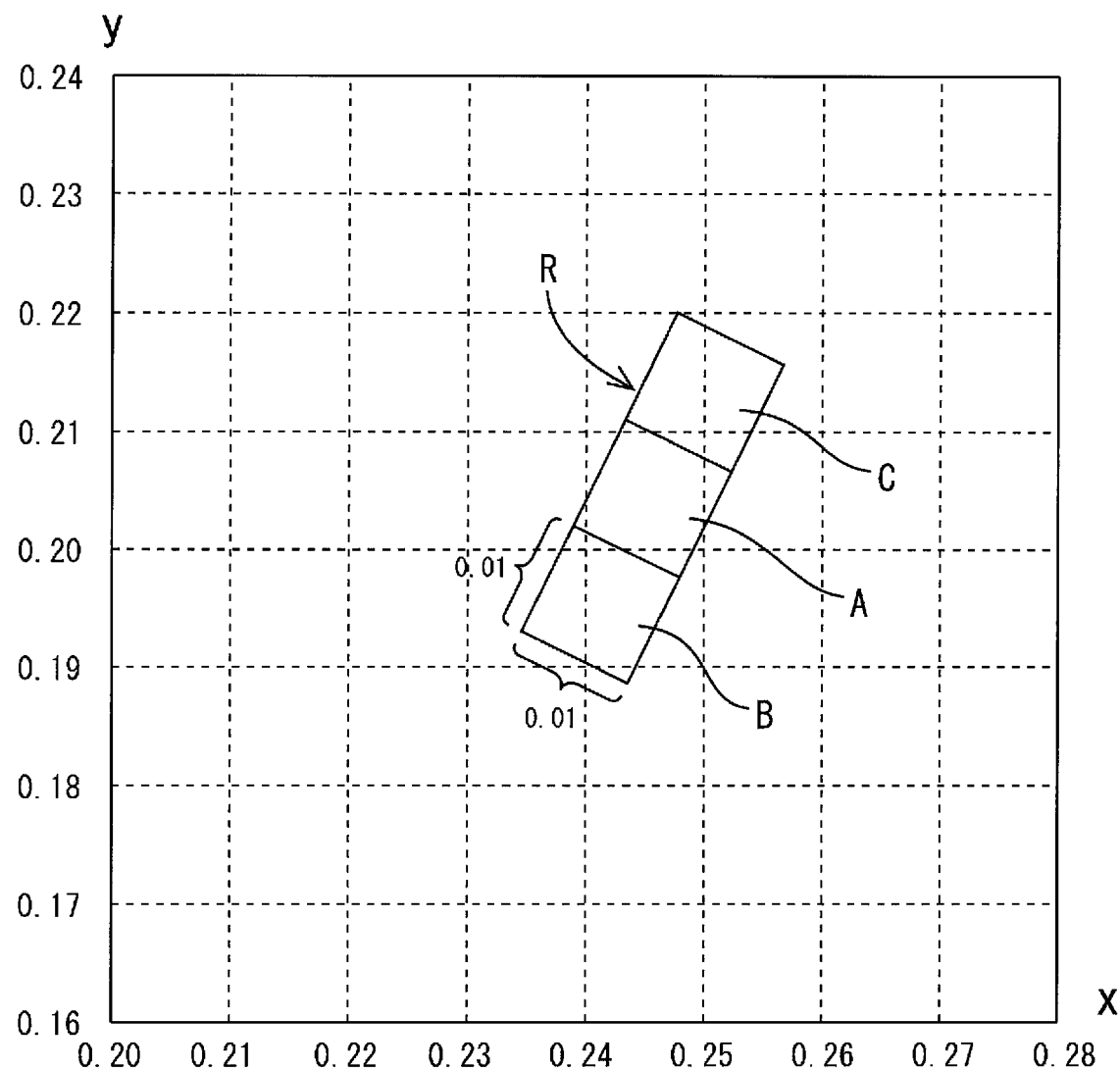
FIG. 14 is a main part enlarged view showing a classification of color tone ranks in FIG. 12.
Figure 15:
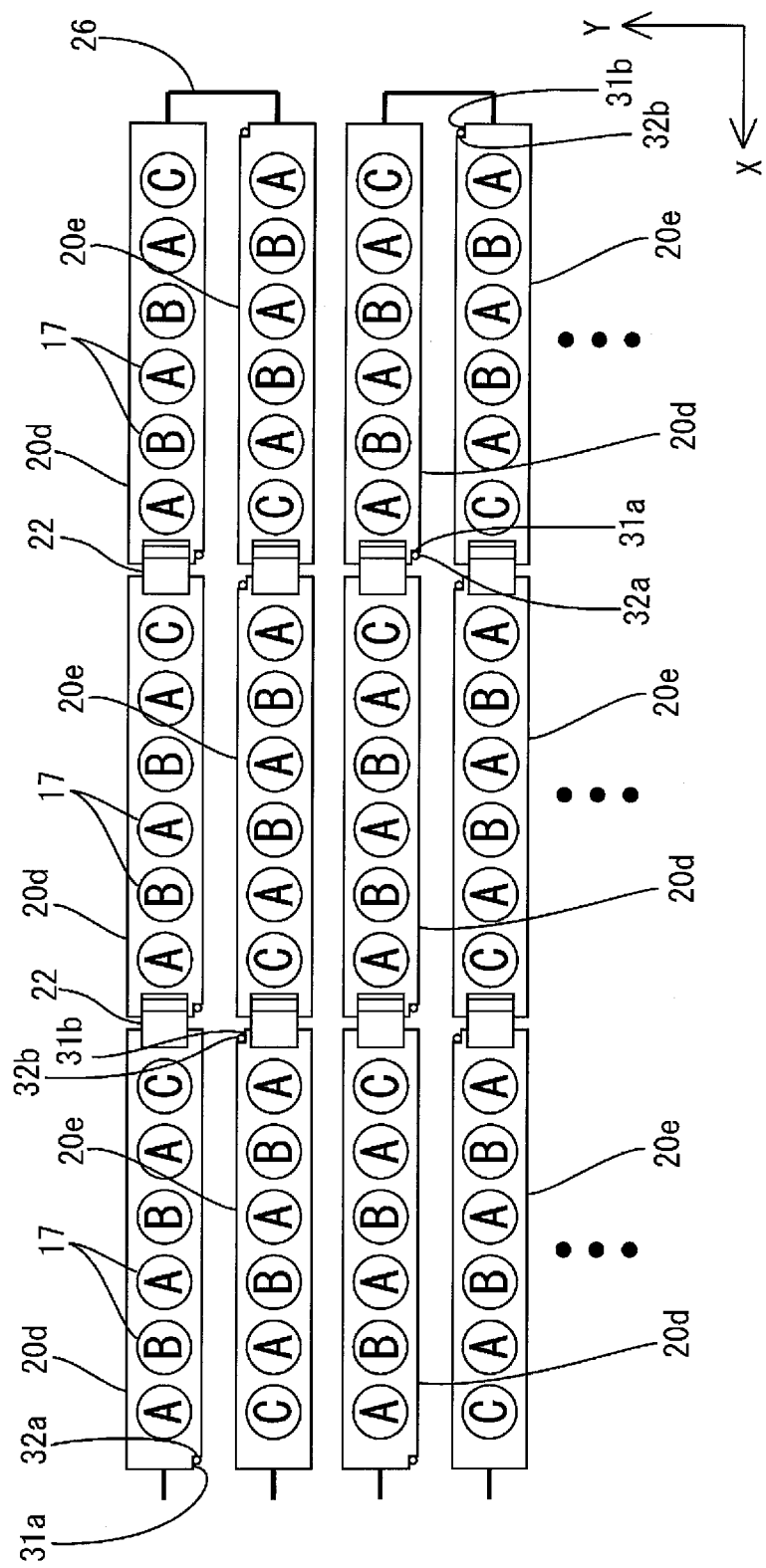
FIG. 15 is a schematic view illustrating an arrangement manner of each color tone rank of the LEDs on the LED boards in a lighting device according to a second embodiment of the present invention.

Next, a second embodiment of the present invention will be described with reference to FIGS. 13 to 15. In the second embodiment, color tone of the LEDS on each LED board will be described. Other configuration is the same as that in the first embodiment. The same components as those in the first embodiment are given the same reference numerals and description thereof is omitted.

The LEDs 17, which are mounted on the LED board 20 (20d and 20e) and emit white light, do not necessarily emit white light in uniform color tone, and uneven color tone (variation) exist in white color. Thus, in this embodiment, the arrangement manner of the LEDs 17 is determined according to color tone rank. First, the color tone rank of each LED 17 will be described with reference to FIGS. 13 and 14. FIG. 13 is a chromaticity chart stipulated by the CIE (International Commission on Illumination) in 1931, and FIG. 14 is a main part enlarged view showing a classification of the color tone ranks in FIG. 13.

Figure 13:
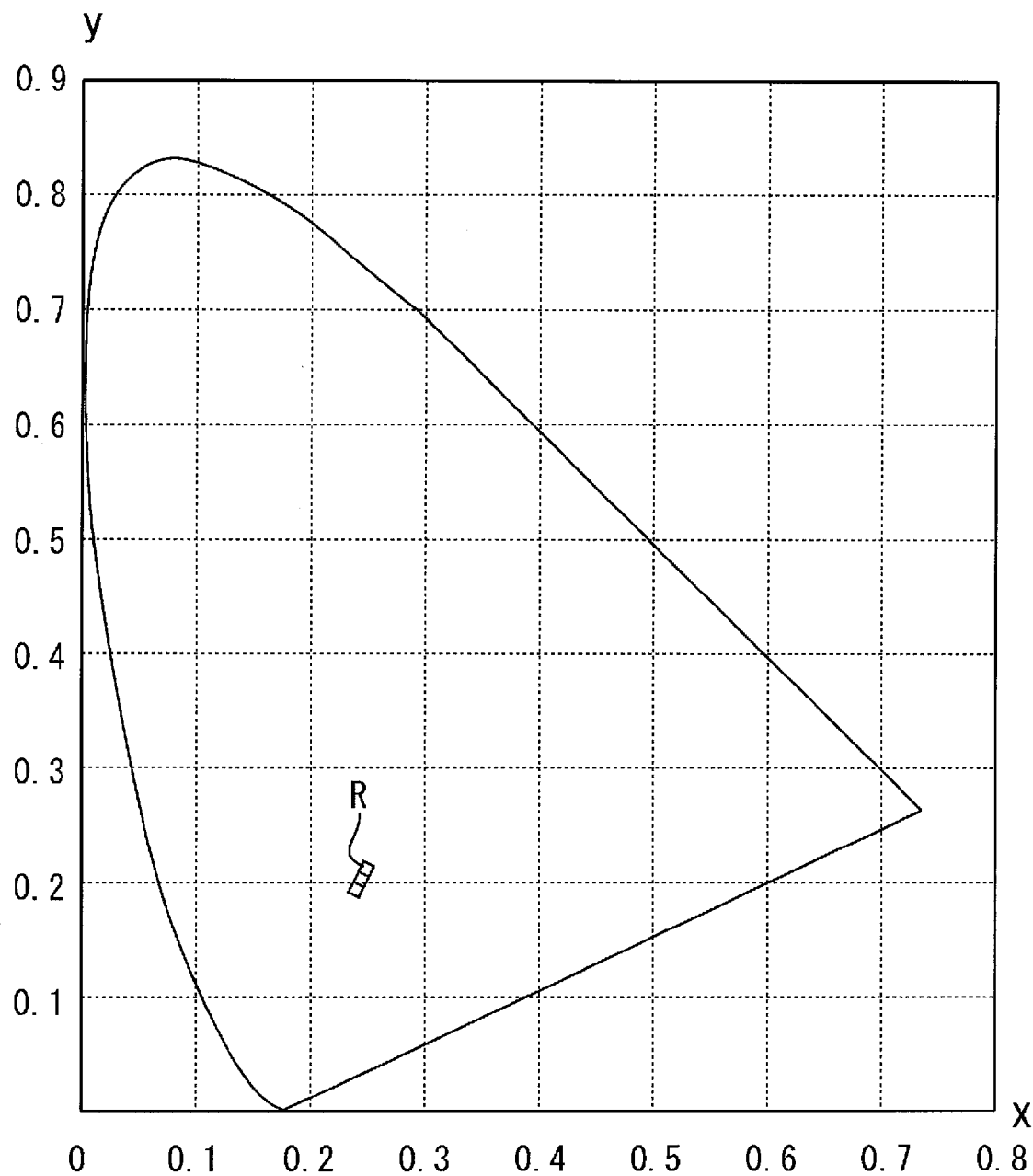
FIG. 13 is a chromaticity chart settled by the CIE (International Commission on Illumination) in 1931.

The color tone of each LED 17 in this embodiment varies within the scope of a used region R surrounded with a solid line in the CIE 1931 coordinates in FIG. 13. In this embodiment, as shown in FIG. 14, the used region R is classified into three color tone ranks A, B and C, each of which is surrounded with a square with one side of 0.01 in coordinate distance. Describing in more detail, a central section of the used region R is defined as the color tone rank A. The color tone rank A is an original target value of the color tone, and the largest number of LEDs 17 in the color tone rank A. A section obliquely below the color tone rank A is defined as the color tone rank B, and a section obliquely above the color tone rank A is defined as the color tone rank C. The LEDs 17 having the color tone deviated from the target value in the color tone ranks B and C. In this manner, the color tone rank A and color tone rank B are two adjacent color tone ranks, and the color tone rank A and color tone rank C are two adjacent color tone ranks. In other words, the color tone rank B is not adjacent to the color tone rank C. In the LEDs 17 in the same color tone rank among the color tone ranks A, B AND C, each of which is surrounded with the square 0.01 in coordinate distance, uneven color tone is not visibly recognized.

Next, the arrangement manner of the color tone ranks of the LEDs 17 arranged on the first LED board 20d and the second LED board 20e will be described with reference to FIG. 15. FIG. 15 is a schematic view illustrating the arrangement manner of each color tone rank of the LEDs on the LED boards.

First, an arrangement manner of the first LED boards 20d and the second LED boards 20e will be described. As shown in FIG. 15, in the first row located uppermost, the three first LED boards 20d are serially coupled to one another with the connectors 22. The first LED board-side notch 31a is formed at a bottom-left corner of each first LED board 20d. When the first LED board 20d is arranged at the normal position of the chassis 14, the first chassis-side protruding portion 32a is fitted into the first LED board-side notch 31a. In the second row below the first row, the three second LED boards 20e are serially coupled to one another with the connectors 22. The second LED board-side notch 31b is formed at a top-right corner of each second LED board 20e. When the second LED board 20e is arranged at the normal position of the chassis 14, the second chassis-side protruding portion 32b is fitted into the second LED board-side notch 31b. Since the first LED board-side notch 31a and second chassis-side protruding portion 32b, as well as the second LED board-side notch 31b and the first chassis-side protruding portion 32a do not correspond to each other in position, they cannot be assembled.

Subsequently, the arrangement manner of the color tone ranks of the LEDs 17 on the LED boards 20d and 20e will be described. First, noting the row direction (X-axis direction, the long-side direction of the chassis 14, the longitudinal direction of the first LED boards 20d and the second LED boards 20e), the color tone ranks of the LEDs 17 on the first LED board 20d are arranged in the order of A, B, A, B, A, C from the left. Accordingly, the adjacent LEDs 17 and 17 on the first LED board 20d in the two adjacent color tone ranks (A and B, or A and C).

The color tone ranks of the LEDs 17 on the second LED board 20e are arranged in the order of C, A, B, A, B, A from the left in this figure in the reversed manner to the first LED board 20d. The adjacent LEDs 17 and 17 on the second LED board 20e are also in the two adjacent color tone ranks (A and B, or A and C). The first LED board 20d is arranged in the third row and the second LED board 20e is arranged in the fourth row. The same arrangement is repeated thereafter.

In the X-axis direction, the adjacent LEDs 17 and 17 between the serially coupled first LED boards 20d and 20d in the first row are in the adjacent color tone ranks (A and C). The adjacent LEDs 17 and 17 between the serially coupled second LED boards 20e and 20e in the second row are also in the adjacent color tone ranks (A and C). In this manner, all of the adjacent LEDs 17 and 17 in the X-axis direction are in the two adjacent color tone ranks (A and C). In other words, in the X-axis direction, the LEDs 17 in the color tone ranks two or more apart from each other (e.g., B and C) are not adjacently arranged.

Noting the arrangement of the LEDs 17 in the column direction (Y-axis direction, short-side direction of the chassis 14, parallel arrangement direction of the first LED boards 20d and the second LED boards 20e), the color tone ranks of the LEDs 17 in the first column at the left end in this figure are arranged in the order of A, C, A, C . . . , the color tone ranks in the second column are arranged in the order of B, A, B, A . . . and the color tone ranks in the third column are arranged in the order of A, B, A, B . . . . In this manner, also between the parallely arranged first LED board 20d and the second LED board 20e, that is, in the column direction (Y-axis direction), the adjacent LEDs 17 and 17 are in the two adjacent color tone ranks (A and B, or A and C). In other words, also in the Y-axis direction, the LEDs 17 in the color tone ranks with a difference of two or more (B and C) are not adjacent to each other.

In this embodiment, the first LED board 20d at the right end in the first row is electrically connected to the second LED board 20e at the right end in the second row by means of a wiring 26. Thus, by inputting driving power from the first LED board 20d at the left end in the first row, each LED 17 on the first LED boards 20d in the first row and the second LED boards 20e in the second row can be lit by one control unit.

As described above, in this embodiment, the plurality of LEDs 17 is classified into the three color tone ranks A, B AND C each forming a square with one side of 0.01 in coordinate distance in the CIE 1931 coordinates according to color tone, and the arrangement manner of the color tone ranks of the LEDs 17 on the first LED board 20d is different from that on the second LED board 20e.

For example, when only the LEDs 17 in the same color tone rank are used, to ensure the predetermined number of LEDs 17, the LEDs 17 must be produced more than required. In addition, unusable LEDs 17 can be generated, resulting in an increase in costs. However, by mixing and using the LEDs 17 in different color tone ranks A, B AND C as in this embodiment, as compared to the case where only the LEDs 17 in the same color tone rank are used, the LEDs 17 in the color tone rank in a broader range can be adopted, contributing to cost reduction. Further, by mixing the LEDs 17 in different color tone ranks A, B AND C, color tone is equalized and therefore, illumination light of almost uniform color tone can be obtained.

In this embodiment, to distribute the LEDs 17 in the same color tone rank, the arrangement manner of the color tone ranks of the LEDs 17 on the first LED board 20d is different from that on the second LED board 20e. In this case, by alternately arranging the first LED board 20d and the second LED board 20e, the LEDs 17 in the same color tone rank are hardly arranged unevenly and therefore, the occurrence of uneven color can be suppressed. On the contrary, when the first LED board 20d or the second LED board 20e is wrongly arranged, the LEDs 17 in the same color tone rank may be arranged unevenly, causing uneven color. However, in this embodiment, even if it is attempted to arrange the first LED board 20d at the position where the second LED board 20e should be arranged, the first LED board-side notch 31a and second chassis-side protruding portion 32b are shifted from each other in position and therefore, the board cannot be assembled to the chassis, resulting that the first LED board 20d is prevented from being wrongly arranged. Accordingly, even when the arrangement manner of the color tone ranks of the LEDs 17 on the first LED board 20d is different from that on the second LED board 20e as described, both the LED boards 20d and 20e can be reliably arranged at the normal positions as designed and the occurrence of the uneven color can be suppressed.

In this embodiment, the adjacent LEDs 17 on the first LED board 20d and the second LED board 20e are in the adjacent color tone ranks A and B, or the adjacent color tone ranks A and C. Accordingly, since color tone of the adjacent LEDs 17 does not vary largely, the occurrence of uneven color tone can be suppressed.

The first LED board 20d and the second LED board 20e are arranged in parallel to be adjacent to each other, and the adjacent LEDs 17 are in the adjacent color tone ranks A and B, or the adjacent color tone ranks A and C in the parallel arrangement direction of the first LED board 20d and the second LED board 20e. According to this configuration, since color tone of the adjacent LEDs 17 do not largely vary in the parallel arrangement direction of the first LED board 20d and the second LED board 20e, the occurrence of uneven color tone can be suppressed.

Although the second embodiment of the present invention has been described, the present invention is not limited to the embodiment above, and various following modification examples may be adopted. In each of the following modification examples, the same components and constituents as those in the embodiment above are given the same reference numerals and description thereof is omitted.

<First modification example of Second embodiment>

Figure 16:
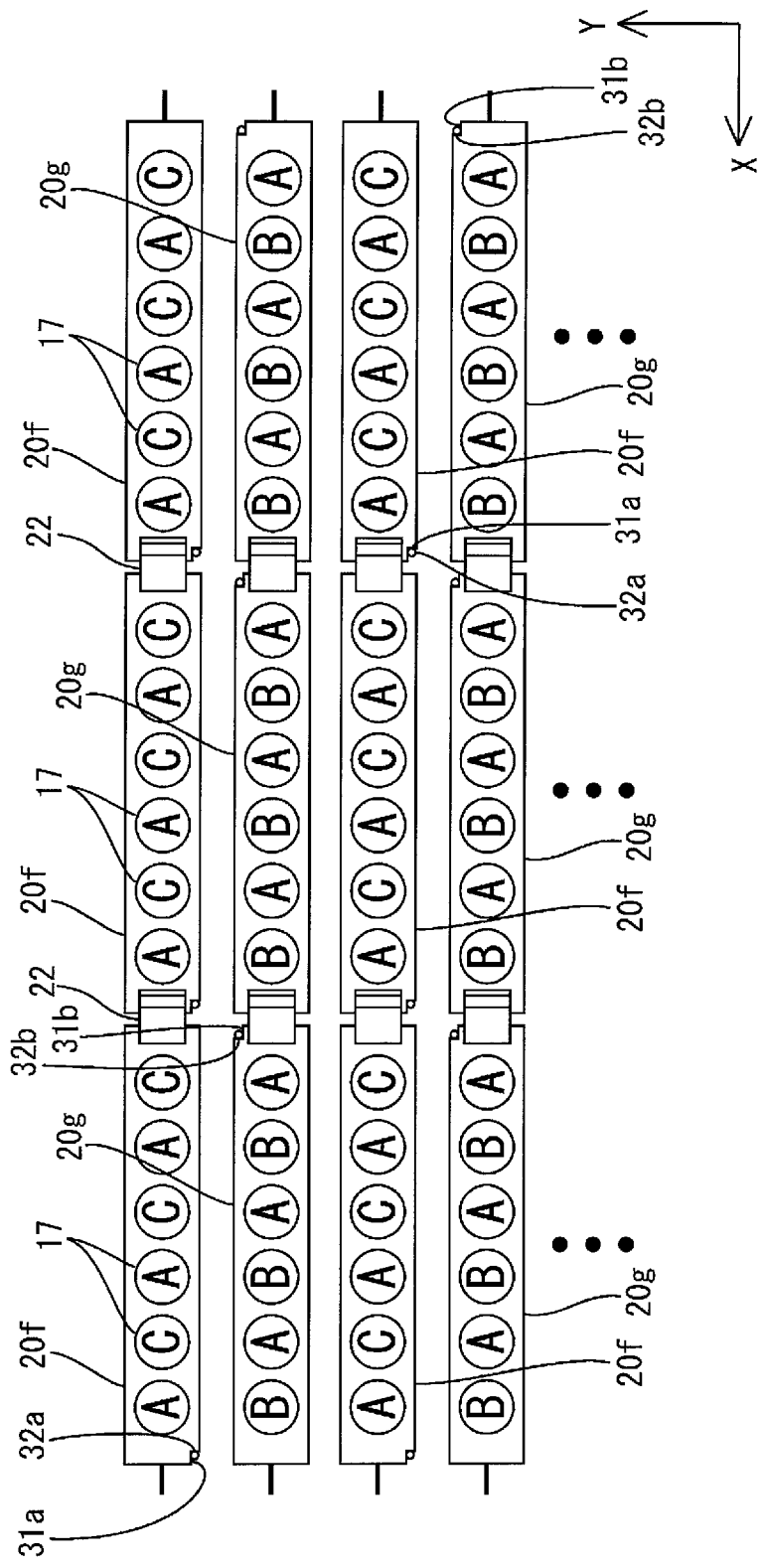
FIG. 16 is a schematic view illustrating another arrangement manner of each color tone rank of the LEDs on the LED boards.

FIG. 16 shows one modification example of the arrangement manner of the LEDs 17. FIG. 16 is a schematic view illustrating another arrangement manner of the color tone ranks of the LEDs on the LED boards.

In FIG. 16, noting the X-axis direction (row direction, longitudinal direction of first LED boards 20f and second LED boards 20g), in the first row located uppermost, the three first LED boards 20f are electrically and physically connected to one another with the connectors 22. The color tone ranks of the LEDs 17 on the first LED board 20f are arranged in the order of A, C, A, C, A, C from the left in this figure. Accordingly, the adjacent LEDs 17 and 17 on the first LED board 20f are in the adjacent color tone ranks (A and C). In the second row, the three second LED boards 20g are electrically and physically connected to one another with the connectors 22. The color tone ranks of the LEDs 17 on the second LED board 20g are arranged in the order of B, A, B, A, B, A from the left in this figure. Accordingly, the adjacent LEDs 17 and 17 on the second LED board 20g are in the adjacent color tone ranks (A and B).

Noting the arrangement of the LEDs 17 in the column direction (Y-axis direction), the color tone rank of the LEDs 17 in the first column at the left end in this figure are arranged in the order of A, B, A, B . . . , and the color tone ranks in the second column are arranged in the order of C, A, C, A . . . . The same arrangement is repeated thereafter. Accordingly, also between the parallely arranged first LED board 20f and second LED board 20g, that is, in the column direction (Y-axis direction), the adjacent LEDs 17 and 17 are in the two adjacent color tone ranks (A and B, or A and C).

According to this configuration, since the adjacent LEDs 17 and 17 are in the two adjacent color tone ranks (A and B, or A and C) in the column direction and the row direction, color tone does not largely vary and therefore, the occurrence of uneven color tone can be suppressed.

Second modification example of second embodiment

Figure 17:
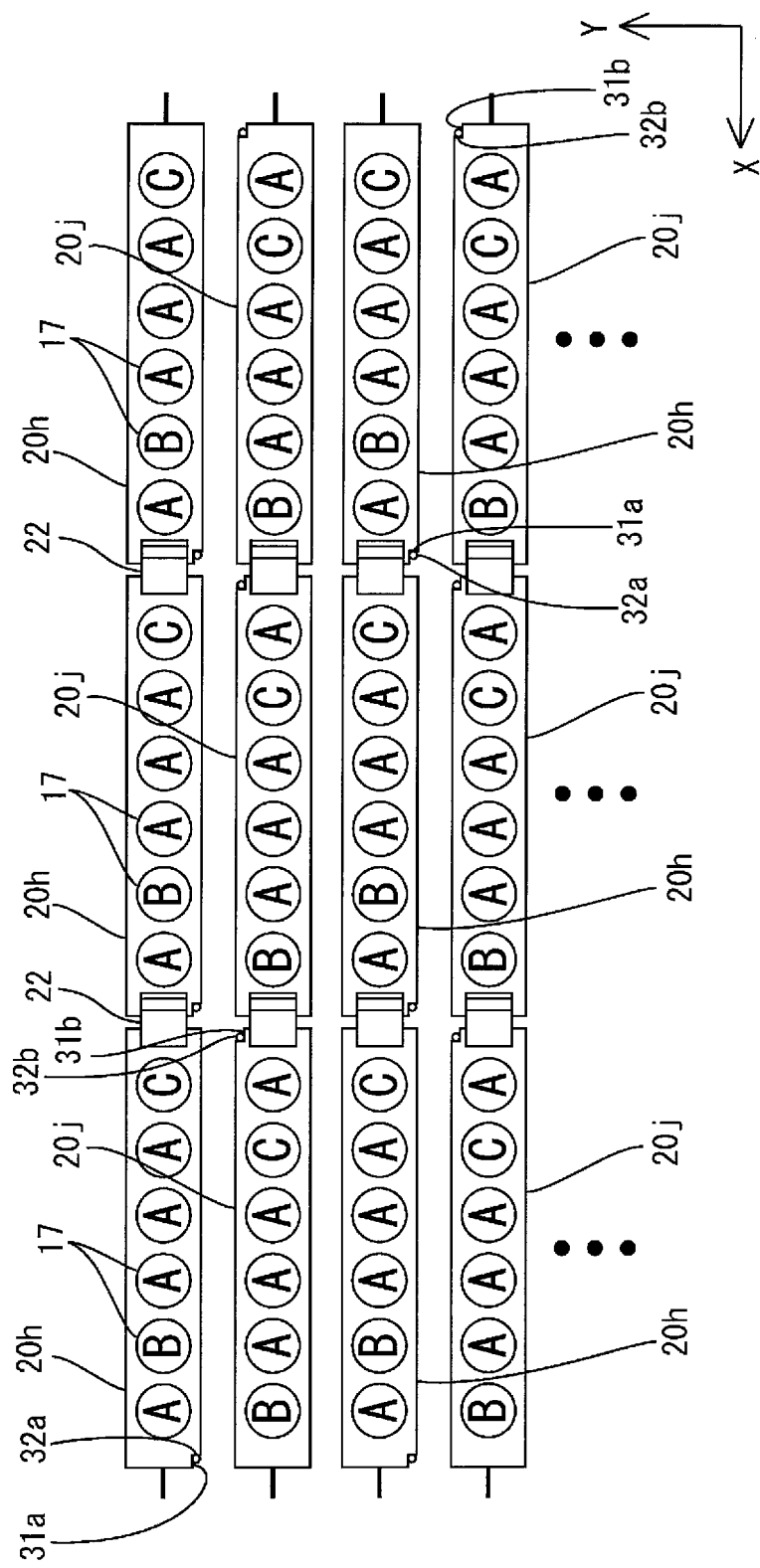
FIG. 17 is a schematic view illustrating still another arrangement manner of each color tone rank of the LEDs on the LED boards.

FIG. 17 shows another modification example of the arrangement manner of the LEDs 17. FIG. 17 is a schematic view illustrating still another arrangement manner of the color tone ranks of the LEDs on the LED boards.

In FIG. 17, noting the X-axis direction (row direction, longitudinal direction of first LED boards 20h and second LED boards 20), in the first row located uppermost, the three first LED boards 20h are electrically and physically connected to one another with the connectors 22. The color tone ranks of the LEDs 17 on the first LED board 20h are arranged in the order of A, B, A, A, A, C from the left in this figure. Accordingly, the adjacent LEDs 17 and 17 on the first LED board 20h are in the same color tone rank (A and A) or the two adjacent color tone ranks (A and B, or A and C). In the second row, three second LED boards 20j are electrically and physically connected to one another with the connectors 22. The color tone ranks of the LEDs 17 on the second LED board 20j are arranged in the order of B, A, A, A, C, A from the left in this figure. Accordingly, the adjacent LEDs 17 and 17 on the second LED board 20j also are in the same color tone rank (A and A) or the two adjacent color tone ranks (A and B, or A and C).

Noting arrangement of the LEDs 17 in the column direction (Y-axis direction, short-side direction of the chassis 14, parallel arrangement direction of the first LED boards 20h and the second LED boards 20j), the color tone ranks of the LEDs 17 in the first column at the left end in this figure are arranged in the order of A, B, A, B . . . , the color tone ranks in the second column are arranged in the order of B, A, B, A . . . , and the color tone ranks in the third column are arranged in the order of A, A, A, A . . . . In this manner, also between the first LED board 20h and second LED board 20j arranged parallel, that is, in the column direction (Y-axis direction), the adjacent LEDs 17 and 17 are in the same color tone rank (A and A) or the two adjacent color tone ranks (A and B, or A and C).

According to this configuration, since the adjacent LEDs 17 and 17 are in the same color tone rank A, or the two adjacent color tone ranks (A and B, or A and C) in the column direction and the row direction, color tones do not largely vary and therefore, the occurrence of uneven color tone can be suppressed. Especially the configuration in this example is suitable for the case where the number of the LEDs 17 belonging to the color tone rank A as the target value of color tone is significantly larger than that of the LEDs 17 belonging to the other color tone ranks B, C.

<Third modification example of second embodiment>

Figure 18:
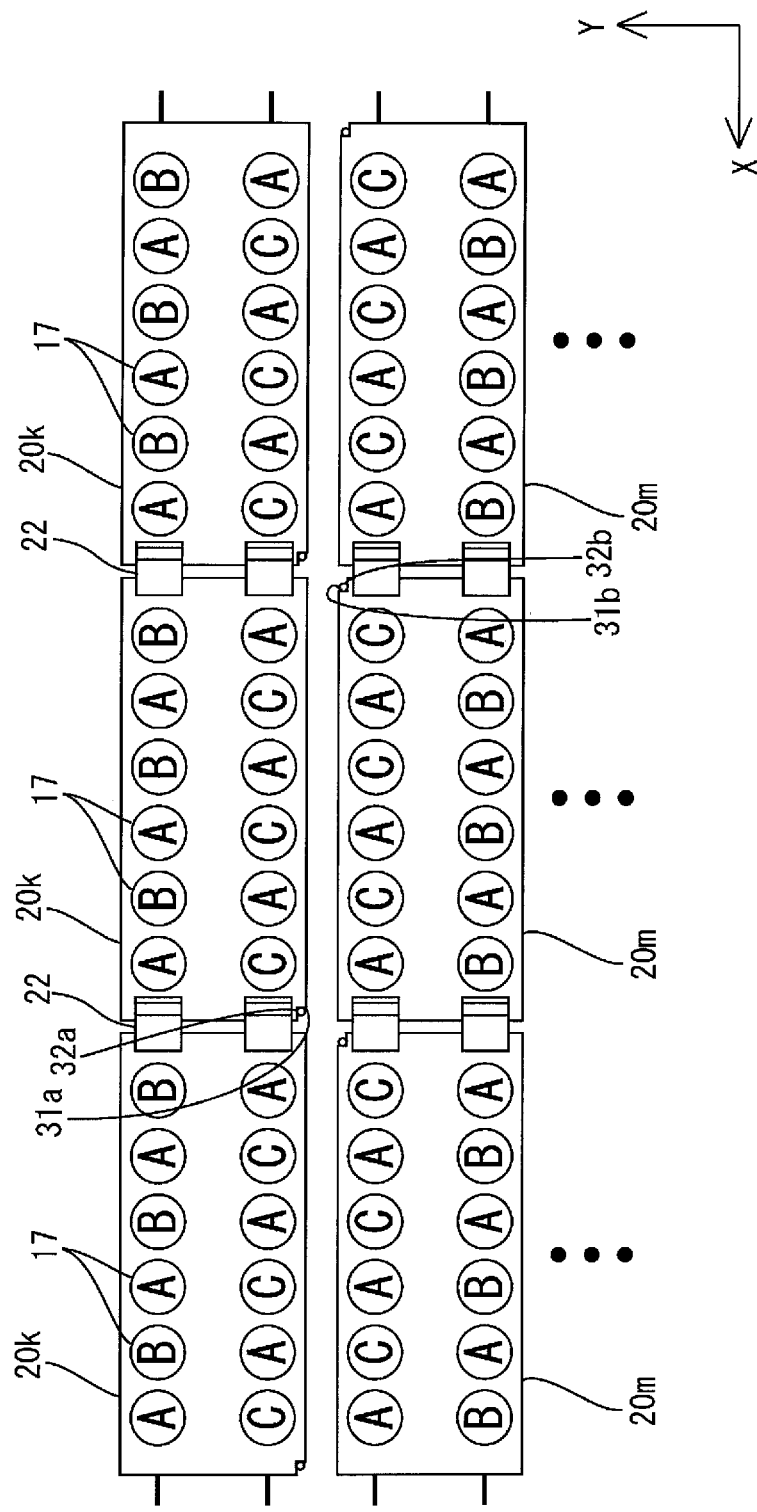
FIG. 18 is a schematic view illustrating another arrangement manner of the LEDs.

FIG. 18 shows another modification example of the arrangement manner of the LEDs 17. FIG. 18 is a schematic view illustrating another arrangement manner of the LEDs.

As shown in FIG. 18, noting the X-axis direction (row direction, longitudinal direction of first LED boards 20k and second LED boards 20m), the three first LED boards 20k are electrically and physically connected to one another with the connectors 22. On the first LED board 20k, the LEDs 17 are arranged in two columns along the X-axis direction (longitudinal direction of the first LED boards 20k), and the LEDs 17 in each column are electrically connected to one another in serial. The color tone ranks of the LEDs 17 in the first row of the first LED board 20k are arranged in the order of A, B, A, B, A, B from the left in this figure. Accordingly, the adjacent LEDs 17 and 17 in the first row of the first LED board 20k are in the adjacent color tone ranks (A and B). The color tone ranks of the LEDs 17 in the second row of the first LED board 20k are arranged in the order of C, A, C, A, C, A from the left in this figure. Accordingly, the adjacent LEDs 17 and 17 in the second row of the first LED board 20k are in the adjacent color tone ranks (A and C).

Below the group of the first LED boards 20k, three second LED boards 20m are electrically and physically connected to one another with the connectors 22. Also on the second LED board 20m, the LEDs 17 are arranged in two columns in the X-axis direction (longitudinal direction of the second LED boards 20m), and the LEDs 17 in each column are electrically connected to one another in serial. The color tone ranks of the LEDs 17 in the first row of the second LED board 20m are arranged in the order of A, C, A, C, A, C from the left in this figure. Accordingly, the adjacent LEDs 17 and 17 in the first row of the second LED board 20m are in the adjacent color tone ranks (A and C). The color tone ranks of the LEDs 17 in the second row of the second LED board 20m are arranged in the order of B, A, B, A, B, A from the left in this figure. Accordingly, the adjacent LEDs 17 and 17 in the second row of the second LED board 20m are in the adjacent color tone ranks (A and B).

Noting the arrangement of the LEDs 17 in the column direction (Y-axis direction, short-side direction of the chassis 14, parallel arrangement direction of the first LED boards 20*k* and the second LED boards 20*m*), the color tone ranks of the LEDs 17 in the first column at the left end in this figure are arranged in the order of A, C, A, B . . . , and the color tone ranks of the LEDs 17 in the second column are arranged in the order of B, A, C, A . . . . This arrangement is repeated thereafter. As described above, also between the first LED board 20*k* and second LED board 20*m* arranged parallel, that is, in the column direction (Y-axis direction), the adjacent LEDs 17 and 17 are in the two adjacent color tone ranks (A and B, or A and C).

According to this configuration, since the adjacent LEDs 17 and 17 are in the two adjacent color tone ranks (A and B, or A and C) in the column direction and the row direction, color tone does not largely vary and therefore, the occurrence of uneven color tone can be suppressed. In particular, in this embodiment, since the LEDs 17 are arranged in a plurality of columns (here, two columns) along the longitudinal direction of the first LED boards 20*k* and the second LED boards 20*m*, the number of the LED boards 20*k* and 20*m* installed with respect to the number of the LEDs 17 can be reduced, thereby achieving reduction of the number of parts and improvement of the working efficiency.

<Other embodiments>

Although the embodiments of the present invention have been described, the present invention is not limited to the embodiments explained in the above description and figures, and for example, following embodiments are included in the technical scope of the present invention.

(1) In the embodiments above, the first LED board-side notch and the second LED board-side notch are provided so as not to overlap with each other when the first LED board and the second LED board are placed while keeping their orientations. However, as long as the first LED board-side notch and the second chassis-side protruding portion, or the second LED board-side notch and the first chassis-side protruding portion cannot be structurally assembled to each other, for example, due to difference in size, relative positions of the members are not limited.

Figure 19:
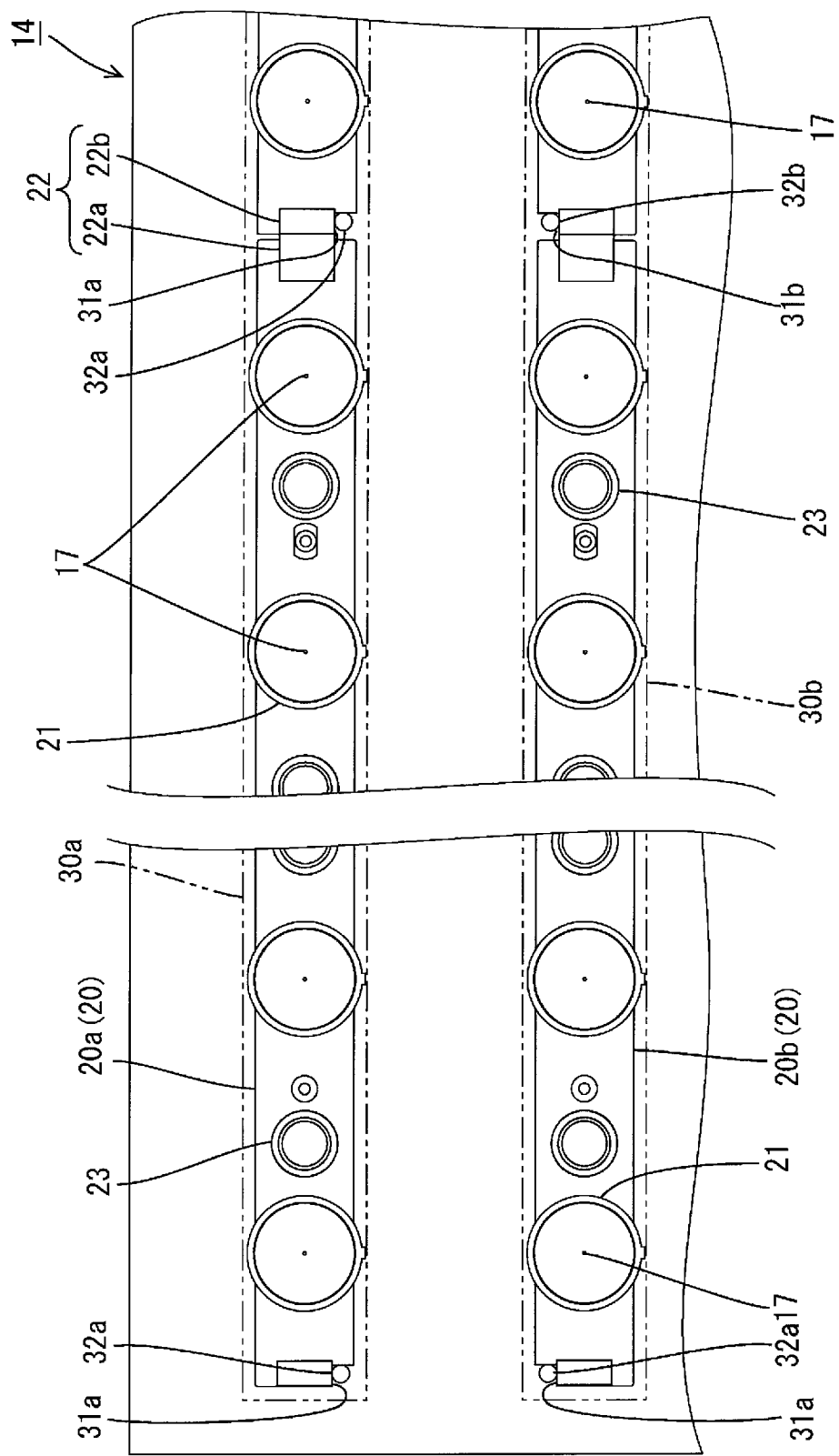
FIG. 19 is an enlarged plan view showing another modification example of the LED boards with respect to the chassis.
Figure 20:
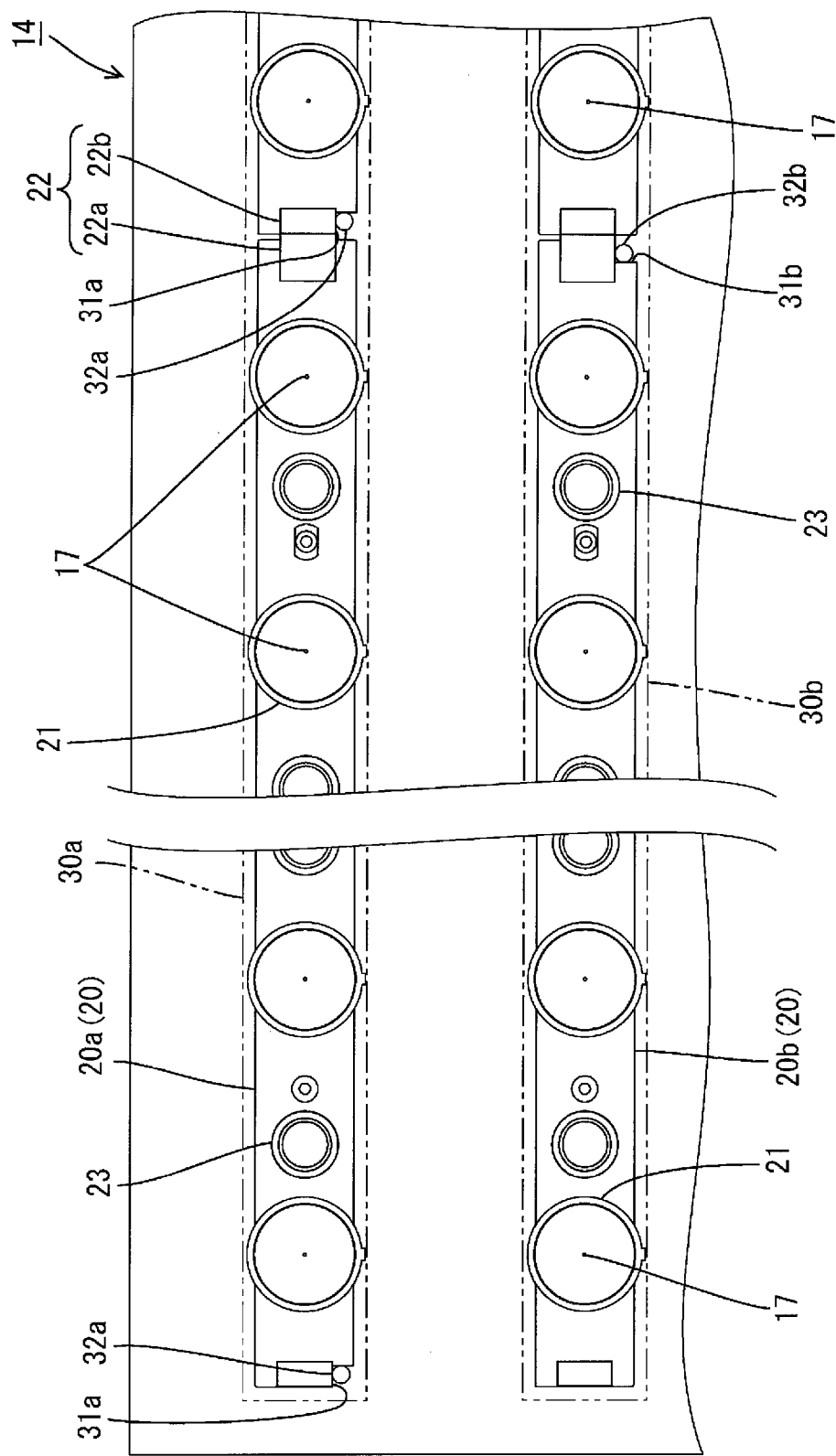
FIG. 20 is an enlarged plan view showing another modification example of the LED boards with respect to the chassis.

(2) In the embodiments above, the first LED board-side notch and the second LED board-side notch are provided to be diagonally located when the first LED board and the second LED board are placed while keeping their orientations. However, for example, as shown in FIG. 19, the first LED board-side notch and the second LED board-side notch may be formed at different corners on short sides overlapping with each other. Alternatively, as shown in FIG. 20, the first LED board-side notch and the second LED board-side notch may be provided at different corners on long sides overlapping with each other. In this case, even if the first LED board is wrongly inverted by 180 degrees and is arranged in the second LED board arrangement area, the first LED board-side notch cannot be assembled to the second chassis-side protruding portion and therefore, wrong board arrangement can be reliably prevented.

(3) Although the interlock portions such as the notches are provided at the ends, specifically, corners of the first LED board and the second LED board in the embodiments above, the interlock portions may be formed at any position as long as they do not hinder the arrangement operation of the first LED board and the second LED board.

Figure 21:
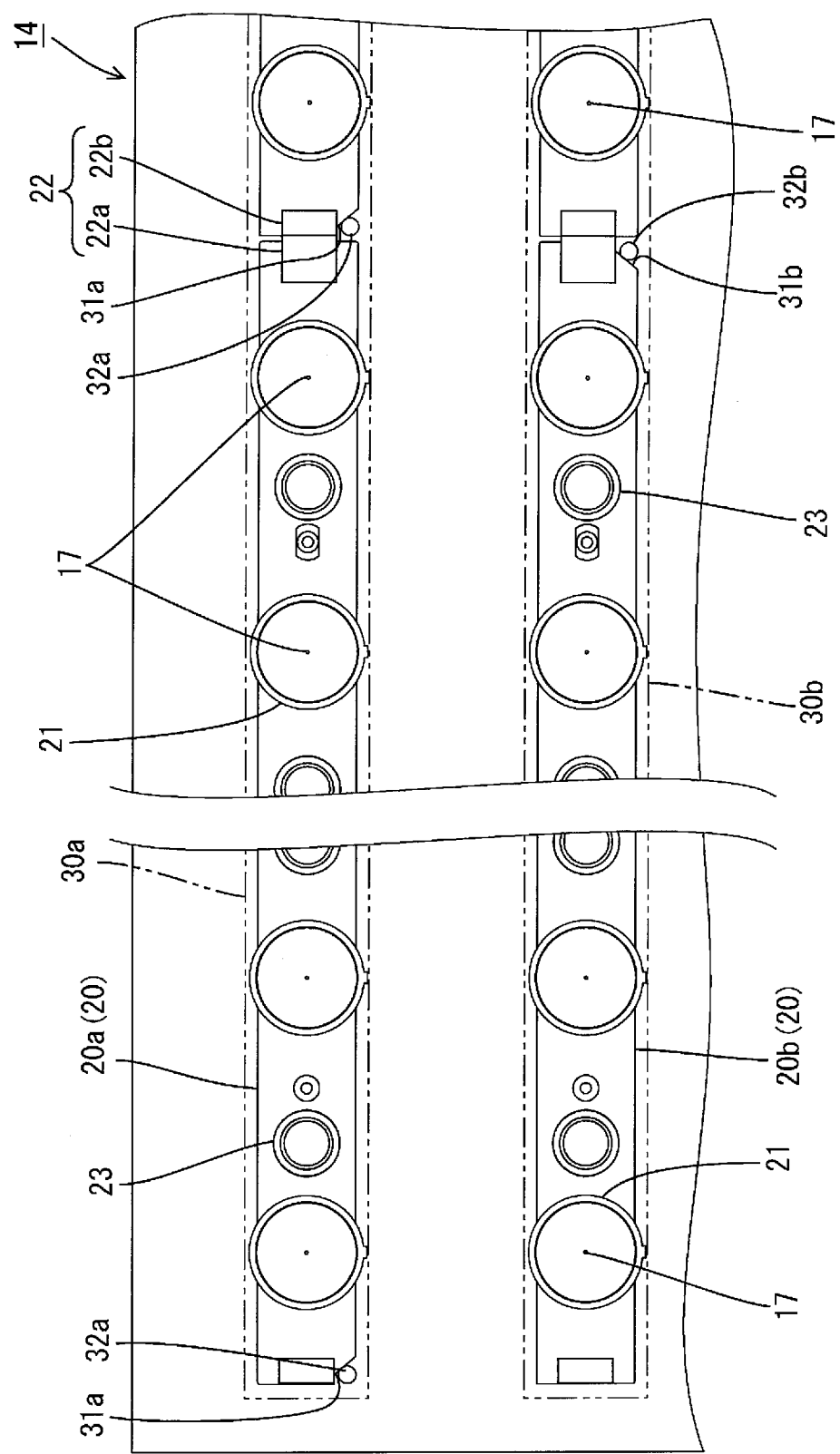
FIG. 21 is an enlarged plan view showing one modification example of notches provided in the LED boards.
Figure 22:
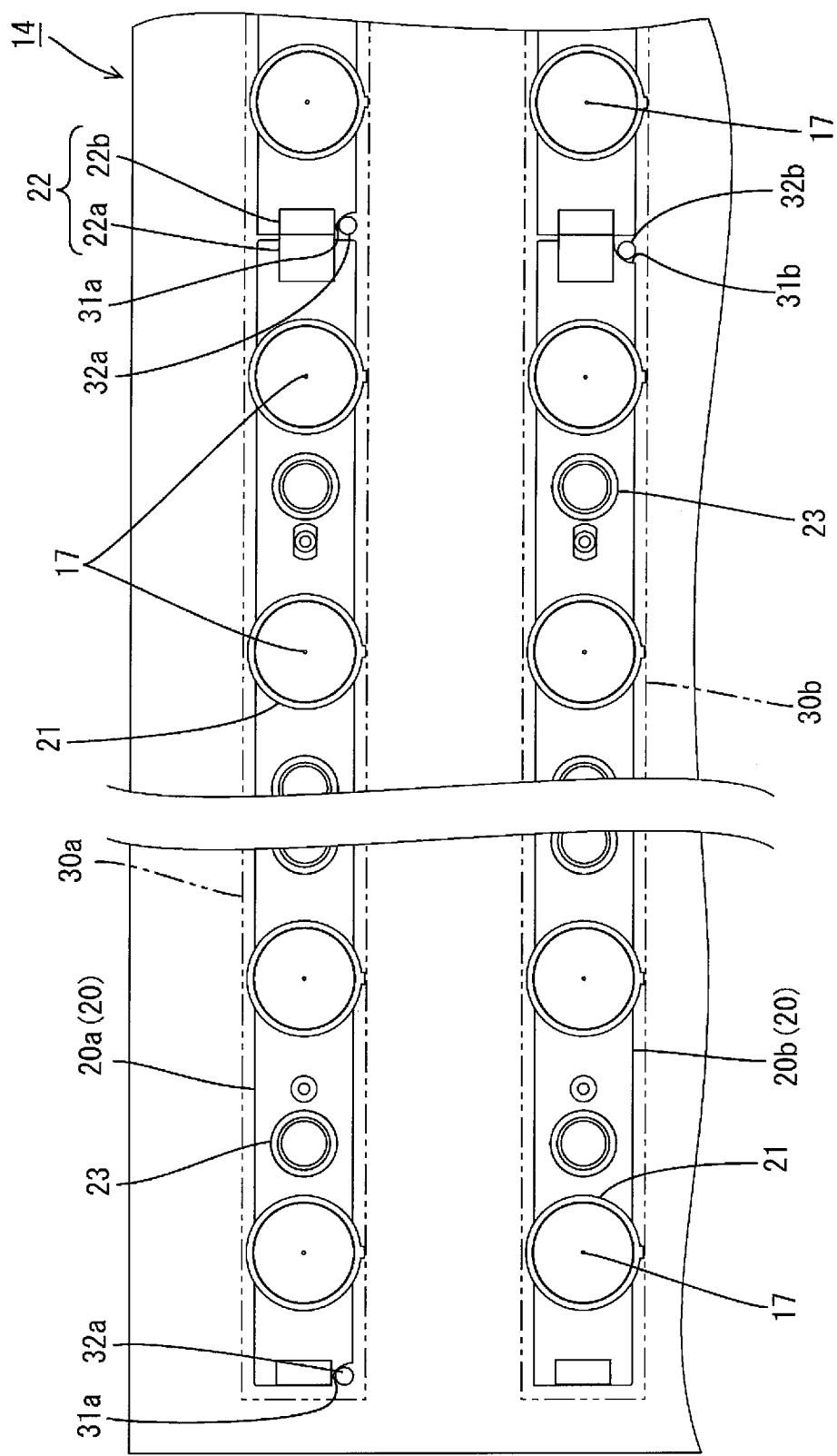
FIG. 22 is an enlarged plan view showing another modification example of configuration of the notches provided in the LED boards.
Figure 23:
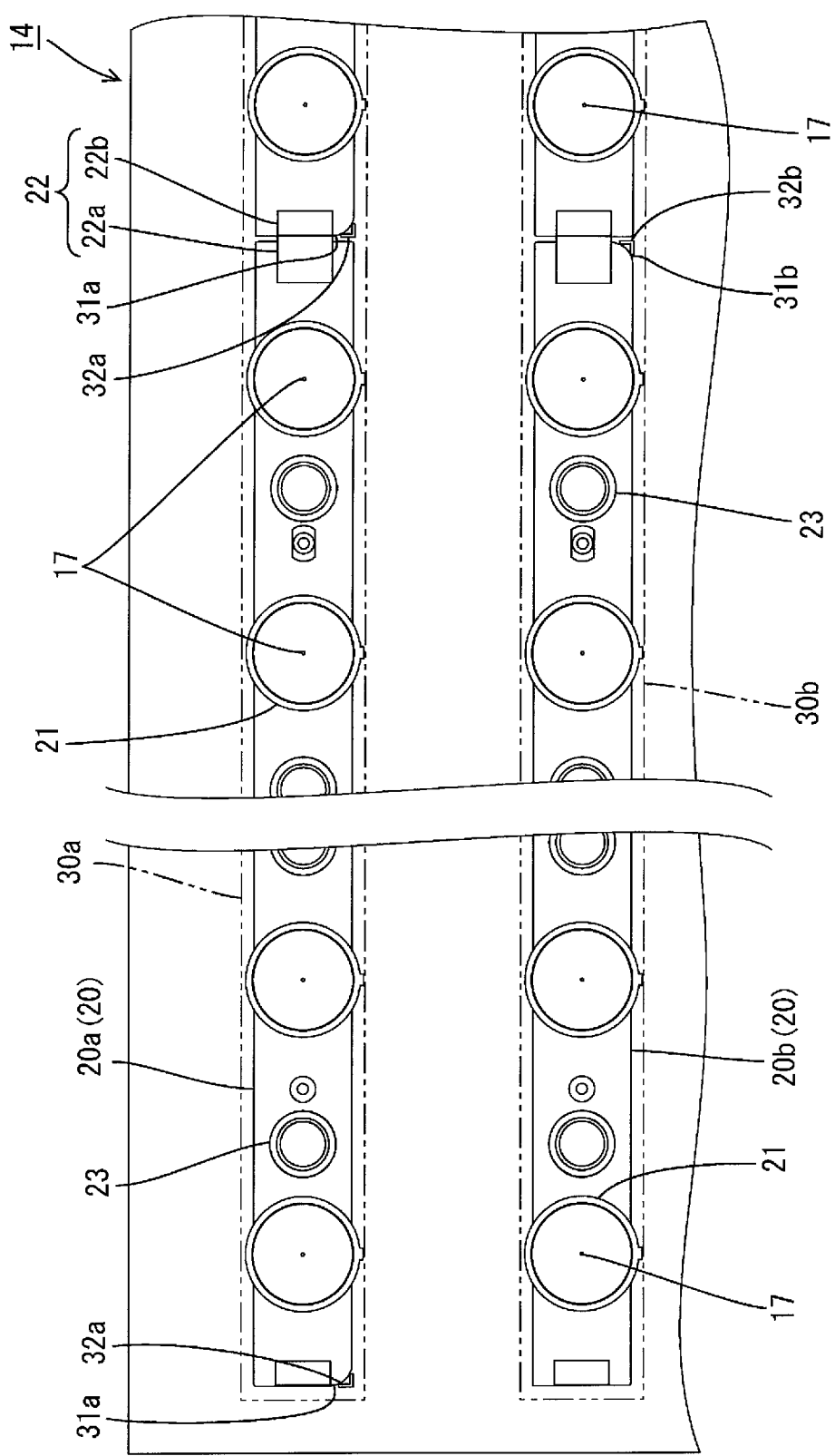
FIG. 23 is an enlarged plan view showing still another modification example of configuration of the notches provided in the LED boards.

(4) Although the interlock portions between the chassis and the LED board are a combination of the notch and the protruding portion, or a combination of the locking portions in the embodiments above, these interlock portions may have any shape as long as the LED board and the chassis can be assembled to each other. The shape of the notch may be triangle shown in FIG. 21, a circular arc shown in FIG. 22 or an inverted circular arc shown in FIG. 23.

Figure 24:
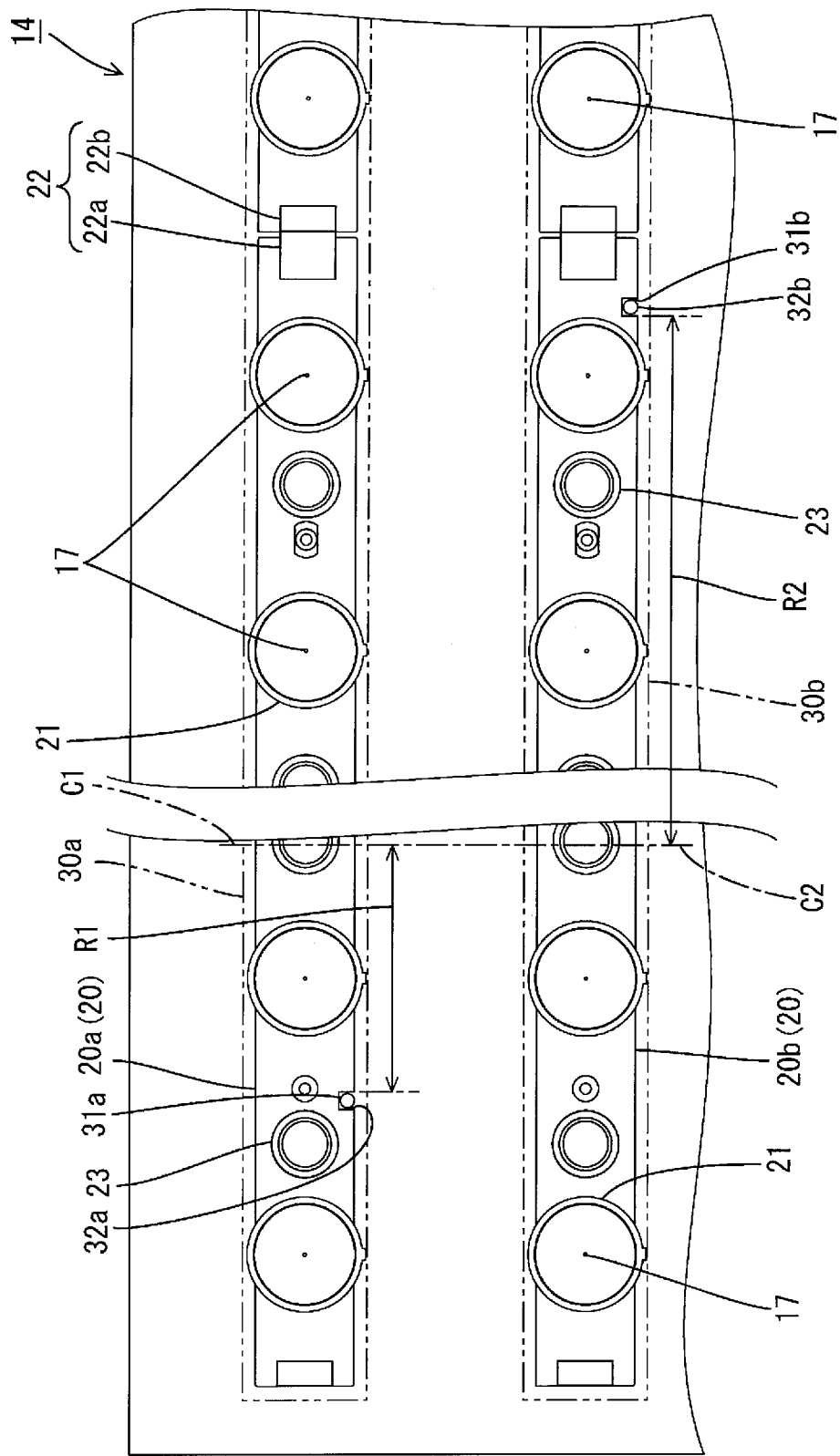
FIG. 24 is an enlarged plan view showing one modification example of an arrangement manner of the notches in the LED boards.

(5) As another arrangement manner of the notch (interlock portion), for example, as shown in FIG. 24, a distance R1 between a first centerline C1 connecting middle points of opposed long sides of the first LED board to each other and the first LED board-side notch may be different from a distance R2 between a second centerline C2 connecting middle points of opposed long sides of the second LED board to each other and the second LED board-side notch. In this case, the first LED board-side notch and the second LED board-side notch are provided so as not to intersect with the centerlines C1 and C2 of the LED boards, respectively.

Figure 25:
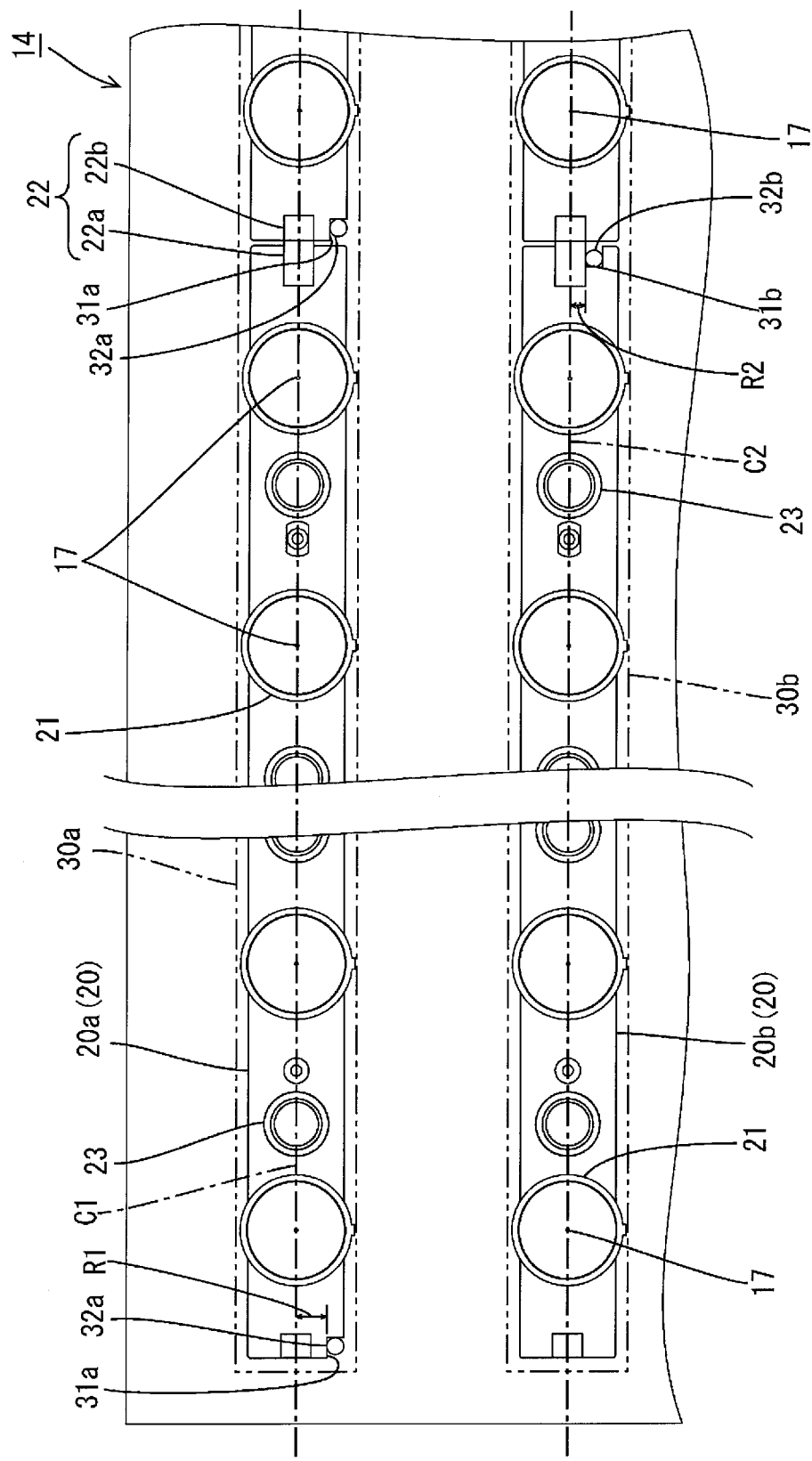
FIG. 25 is an enlarged plan view showing another modification example of the arrangement manner of the notches in the LED boards.

As shown in FIG. 25, a distance R1 between a first centerline C1 connecting middle points of opposed short sides of the first LED board to each other and the first LED board-side notch may be different from a distance R2 between a second centerline C2 connecting middle points of opposed short sides of the second LED board to each other and the second LED board-side notch. In this case, the first LED board-side notch and the second LED board-side notch are provided so as not to intersect with the centerlines C1 and C2 of the LED boards, respectively.

Also with the configuration above, if it is attempted that the first LED board is arranged in the second LED board arrangement area, since the first LED board-side notch and the second chassis-side protruding portion are shifted from each other, they cannot be assembled and therefore, wrong board arrangement can be reliably prevented.

(6) Although the three LED board are coupled in the long-side direction (X-axis direction) of the chassis in the embodiments above, the number of the LED boards may be two or less, or four or more. Similarly, the number of the LEDs arranged on one LED board is not limited to six and may be any number.

(7) Although the LED boards having the same arrangement of LED color tone are coupled to each other in the long-side direction (X-axis direction) of the chassis in the embodiments above, the LED boards having the different arrangement of LED color tone may be coupled to each other.

(8) Although the LED that emits white light is used in the embodiments above, the color is not limited to white and may be any color.

(9) Although the LEDs are arranged in rows and columns in a grid pattern in the embodiments above, for example, the LEDs may be arranged in a hexagonal closest manner, that is, so that a distance between adjacent LEDs is uniform, or the LEDs may be alternately arranged.

(10) Although the color tone rank is classified into three in the embodiments above, the number of color tone ranks is not limited to three, and two or four or more color tone ranks are included in the present invention.

(11) Although the LED that emits white light by applying the phosphor having the luminous peak in the yellow region to the blue light emitting chip is used as the light source in the embodiments above, for example, the light source may be configured of an ultraviolet light emitting chip having the luminous peak around a wavelength of 380 nm and a phosphor that absorbs ultraviolet light and emits fluorescence. At this time, by using a phosphor having the luminous peak in blue, green and red regions as the phosphor, white light can be obtained. White light of such structure has a gentle spectrum over a broad visible light range and is excellent in color rendering properties. Although uneven color may occur due to variation in the amount of the phosphor, the structure of the present invention can make color tones leveled. Thus, it is possible to achieve the lighting device that has excellent color rendering properties and suppressed uneven color.

(12) Although the diffuser lens is arranged so as to cover the LED in the embodiments above, the diffuser lens may not necessarily be arranged. In this case, by closely arranging the LEDs, the occurrence of the point-like lamp image can be suppressed.

(13) Although the LEDs are used as the light sources in the embodiments above, light sources other than the LEDs may be used.

(14) Although a combination of the diffuser plate and the diffusing sheet, a lens sheet or a reflective polarizing sheet is adopted as the optical sheet group in the embodiments above, for example, two stacked diffuser plates may be used as the optical sheet.

(15) Although the connector is white in the embodiments above, the connector may be made of an ivory material as long as it has excellent optical reflectance.

The invention claimed is:

1. A lighting device comprising:
    a first board and a second board each on which a plurality of light sources are mounted; and
    a chassis on which the first board and the second board are arranged, wherein
    the chassis includes a first board arrangement area in which the first board is arranged and a second board arrangement area in which the second board is arranged,
    the first board and the second board are arranged in the first board arrangement area and the second board arrangement area, respectively, in respective predetermined orientations,
    the first board includes a first board-side interlock portion interlocked with a first chassis-side interlock portion with the first board arranged in the first board arrangement area, the first chassis-side interlock portion being provided in the first board arrangement area,
    the second board includes a second board-side interlock portion interlocked with a second chassis-side interlock portion with the second board arranged in the second board arrangement area, the second chassis-side interlock portion being provided in the second board arrangement area, and
    the first board-side interlock portion is configured so as not to be interlocked with the second chassis-side interlock portion with the first board arranged in the second board arrangement area in the predetermined orientation.

2. The lighting device according to claim 1, the first board-side interlock portion and the second board-side interlock portion are arranged so as not overlap with each other with the first board and the second board arranged in the predetermined orientations so as to overlap with each other.

3. The lighting device according to claim 1, wherein:
    each of the first board and the second board has a substantially rectangular plan-view shape;
    the first board-side interlock portion is arranged so as not to intersect with a first centerline connecting midpoints of two opposed sides of the first board to each other; and
    the second board-side interlock portion is arranged so as not to intersect with a second centerline connecting midpoints of two opposed sides of the second board to each other.

4. The lighting device according to claim 3, wherein a distance R1 between the first board-side interlock portion and the first centerline is different from a distance R2 between the second board-side interlock portion and the second centerline.

5. The lighting device according to claim 1, wherein:
    each of the first board and the second board has an elongated shape; and
    the first board-side interlock portion and the second board-side interlock portion are arranged at a longitudinal end of the first board and a longitudinal end of the second board, respectively.

6. The lighting device according to claim 1, wherein:
    each of the first board and the second board has a substantially rectangular plan-view shape; and
    the first board-side interlock portion and the second board-side interlock portion are arranged at a corner of the first board and a corner of the second board, respectively.

7. The lighting device according to claim 6, wherein the first board-side interlock portion and the second board-side interlock portion are arranged diagonally to each other with the first board and the second board arranged in the predetermined orientations.

8. The lighting device according to claim 6, wherein the first board-side interlock portion and the second board-side interlock portion are arranged on a long side of the first board and on a long side of the second board, respectively, the long side of the first board and the long side of the second board overlapping with each other with the first board and the second board arranged in the predetermined orientations.

9. The lighting device according to claim 1, wherein:
    the first board-side interlock portion and the second board-side interlock portion are notches provided in the first board and in the second board, respectively; and
    the first chassis-side interlock portion and the second chassis-side interlock portion are protrusions that protrude from the chassis toward the first board and the second board, respectively, and engage with the respective notches.

10. The lighting device according to claims 1, wherein:
    the first chassis-side interlock portion and the second chassis-side interlock portion are notches provided in the chassis; and
    the first board-side interlock portion and the second board-side interlock portion are protrusions that protrude toward the chassis and engage with the respective notches.

11. The lighting device according to claim 1, wherein:
    the plurality of light sources are classified into two or more color tone ranks each forming a square with one side of 0.01 in coordinate distance in CIE 1931 coordinates according to color tone;
    the light sources in the different color tone ranks are arranged in the chassis such that the color tone ranks of the light sources on the first board are arranged differently from those of the light sources on the second board.

12. The lighting device according to claim 11, wherein the adjacent light sources on the first board and the second board are in the same color tone rank or the two adjacent color tone ranks.

13. The lighting device according to claim 11, wherein:
    the first board and the second board are arranged parallel to and adjacently to each other; and
    the light sources adjacently arranged in a direction in which the first board and the second board are arranged are in the same color tone rank or the two adjacent color tone ranks.

14. The lighting device according to claim 1, wherein:
    each of the first board and the second board has an elongated shape; and the plurality of light sources are linearly arranged along a longitudinal direction of the first board and the second board.

15. The lighting device according to claim 1, wherein:
each of the first board and the second board has an elongated shape; and
the plurality of light sources are arranged in a plurality of columns along a longitudinal direction of the first board and the second board.

16. The lighting device according to claim 1, wherein:
the first board and the second board has an elongated shape;
the first board includes a plurality of first boards and the second board includes a plurality of second boards, the first board and the second boards being arranged along the longitudinal direction; and
the adjacent first boards are connected with a connector and the adjacent second boards are connected with a connector.

17. The lighting device according to claim 16, wherein:
each of the connectors includes a first connector and a second connector that are engaged with each other; and
at least one of the first connector and the second connector project further than an end of the first board or the second board with respect to the longitudinal direction thereof.

18. The lighting device according to claim 16, wherein the connector is ivory or white in color.

19. The lighting device according to claim 1, wherein:
each of the first board and the second board has an elongated shape;
the chassis has a rectangular plan-view shape; and
the first board and the second board are arranged with the longitudinal direction thereof aligned with the long-side direction of the chassis.

20. The lighting device according to claim 1, wherein the light sources are light emitting diodes.

21. The lighting device according to claim 1, wherein the light sources are light emitting diodes each including a blue-light-emitting chip with a phosphor having a luminous peak in a yellow region applied thereto to emit white light.

22. The lighting device according to claim 1, wherein the light sources are light emitting diodes each including a blue-light-emitting chip with a phosphor having a luminous peak in green and red regions applied thereto to emit white light.

23. The lighting device according to claim 1, wherein the light sources are light emitting diodes each including a blue-light-emitting chip with a phosphor having a luminous peak in a green region applied thereto and a red chip, the blue-light-emitting diode and the red chip are combined to emit white light.

24. The lighting device according to claim 1, wherein the light sources are light emitting diodes each including a blue-light-emitting chip, a green-light-emitting chip, and a red-light-emitting chip combined to emit white light.

25. The lighting device according to claim 1, wherein each of the light sources includes an ultraviolet-light-emitting chip and a phosphor.

26. The lighting device according to claim 1, wherein each of the light sources includes an ultraviolet-light-emitting chip and a phosphor having a luminous peak in blue, green and red regions.

27. The lighting device according to claim 1, wherein the light sources are electrically connected in serial.

28. The lighting device according to claim 1, further comprising diffuser lenses are mounted to the first board and the second board so as to cover the light sources, each of the diffuser lenses is configured to diffuse light from the corresponding light source.

29. The lighting device according to claim 28, wherein each of the diffuser lenses is a light diffusing member configured to diffuse light.

30. The lighting device according to claim 28, wherein the each of the diffuser lenses has a roughened surface by surface roughening treatment on the side close to the first board and the second board.

31. A display device comprising:
the lighting device according to claim 1; and
a display panel configured to provide display using light from the lighting device.

32. The display device according to claim 31, wherein the display panel is a liquid crystal panel using liquid crystal.

33. A television receiver comprising the display device according to claim 31.

* * * * *